(12) United States Patent
Rofougaran

(10) Patent No.: US 8,509,190 B2
(45) Date of Patent: *Aug. 13, 2013

(54) HANDHELD COMPUTING UNIT WITH POWER MANAGEMENT

(75) Inventor: Ahmadreza (Reza) Rofougaran, Newport Coast, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/356,767

(22) Filed: Jan. 24, 2012

(65) Prior Publication Data

US 2012/0120837 A1    May 17, 2012

Related U.S. Application Data

(63) Continuation of application No. 12/495,253, filed on Jun. 30, 2009, now Pat. No. 8,125,959, which is a continuation-in-part of application No. 12/026,681, filed on Feb. 6, 2008, now abandoned.

(51) Int. Cl.
*H04W 4/00*    (2009.01)

(52) U.S. Cl.
USPC ........................................... 370/331

(58) Field of Classification Search
USPC ................. 370/331, 338, 339, 328, 329, 310, 370/389, 392, 395.6, 401, 432, 466, 467, 370/469, 295, 281; 455/556, 557, 556.1; 710/2; 709/224, 222, 219, 221
See application file for complete search history.

(56) References Cited

U.S. PATENT DOCUMENTS 8,125,959 B2 * 2/2012 Rofougaran .................. 370/331

* cited by examiner

*Primary Examiner* — Chi Pham
*Assistant Examiner* — Alexander O Boakye
(74) *Attorney, Agent, or Firm* — Garlick & Markison; Jessica W. Smith

(57) ABSTRACT

A handheld computing unit includes a plurality of PHY units, a local wireless interface (LWI), and a processing module. When the unit is in a femtocell AP mode, the processing module performs one or more femtocell AP functions to facilitate conversion of a LWI downstream data into one or more downstream PHY signals and conversion of one or more upstream PHY signals into the LWI upstream data; determines energy demand of the handheld computing unit; determines whether the energy demand compares unfavorably to energy performance criteria; and, when the energy demand compares unfavorably to the energy performance criteria, executes an energy adjustment algorithm.

20 Claims, 17 Drawing Sheets

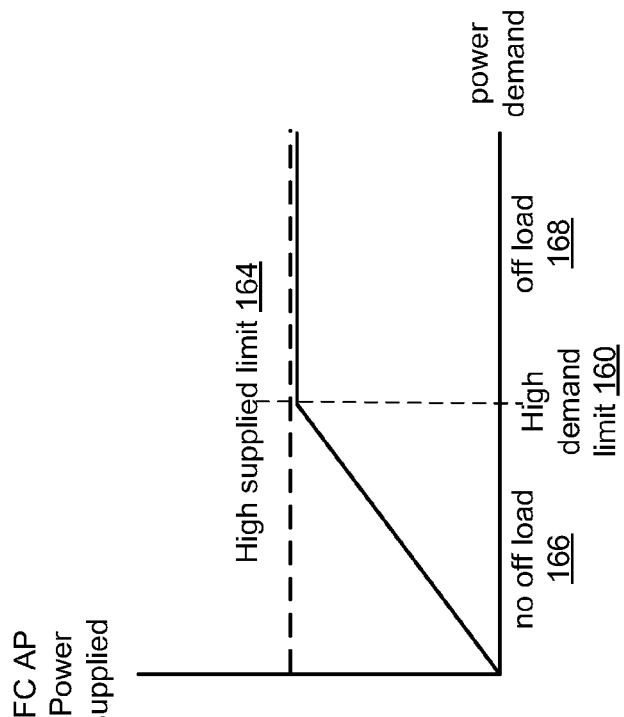
FIG. 9A
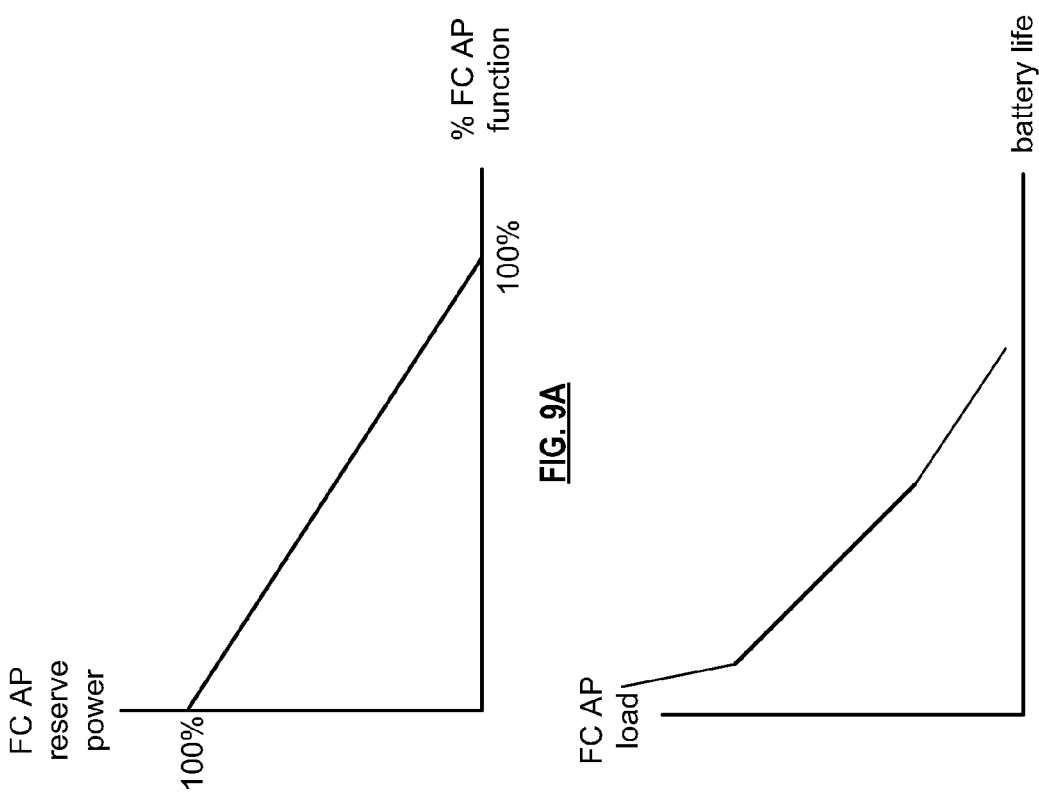
FIG. 9B
FIG. 9C

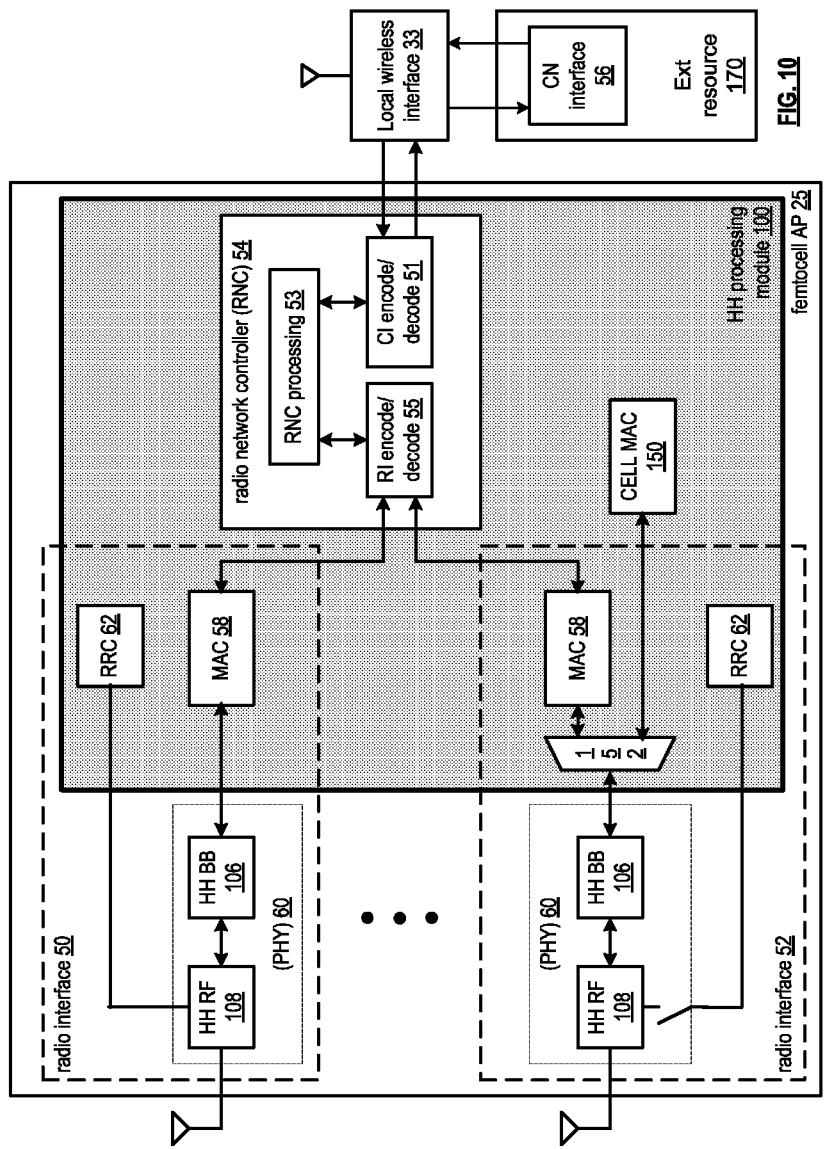

HANDHELD COMPUTING UNIT WITH POWER MANAGEMENT

CROSS REFERENCE TO RELATED PATENTS/PATENT APPLICATIONS

The present U.S. Utility patent application claims priority pursuant to 35 U.S.C. §120, as a continuation, to the following U.S. Utility patent application which is hereby incorporated herein by reference in its entirety and made part of the present U.S. Utility patent application for all purposes:

1. U.S. Utility patent application Ser. No. 12/495,253, entitled "HANDHELD COMPUTING UNIT WITH POWER MANAGEMENT," filed Jun. 30, 2009, pending, which claims priority pursuant to 35 U.S.C. §120, as a continuation-in-part (CIP), to the following U.S. Utility patent application which is hereby incorporated herein by reference in its entirety and made part of the present U.S. Utility patent application for all purposes:

2. U.S. Utility patent application Ser. No. 12/026,681, entitled "COMPUTING DEVICE WITH HANDHELD AND EXTENDED COMPUTING UNITS," filed Feb. 6, 2008, pending.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

1. Technical Field of the Invention

This invention relates generally to communication systems and more particularly to handheld computing devices used in such communication systems.

2. Description of Related Art

Communication systems are known to support wireless and wire lined communications between wireless and/or wire lined communication devices. Such communication systems range from national and/or international cellular telephone systems to the Internet to point-to-point in-home wireless networks to radio frequency identification (RFID) systems. Each type of communication system is constructed, and hence operates, in accordance with one or more communication standards. For instance, wireless communication systems may operate in accordance with one or more standards including, but not limited to, IEEE 802.11, IEEE 802.15.4, Bluetooth, global system for mobile communications (GSM), wideband code division multiplexing (WCDMA), enhanced data rates for GSM evolution (EDGE), universal mobile telecommunications system (UMTS), long term evolution (LTE), IEEE 802.16, evolution data optimized (EV-DO), and/or variations thereof.

Depending on the type of wireless communication system, a wireless communication device, such as a cellular telephone, two-way radio, personal digital assistant (PDA), personal computer (PC), laptop computer, home entertainment equipment, RFID reader, RFID tag, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

An issue arises for indirect wireless communications when one or more of the wireless communication devices are indoors. In this instance, the structure of a building impedes wireless transmissions, which decreases the wireless communication device's ability to communication with a base station or access point. To address this issue, the wireless communication industry is creating standards for the deployment of femtocells. In general, a femtocell is a small cellular base station designed for in-building use that connects to the core mobile network via the internet. A typical femtocell supports a small number of users (e.g., 2-6 cell phones).

As femtocells are introduced to the market, there are many deployment challenges. One challenge is producing economical femtocells. Another challenge is the portability of femtocells. For example, the size and transportability of a femtocell are issues that affect the ability to easily use a femtocell at various locations (home, office, on vacation, etc.). Other challenges include processing of cellular telephone calls, interference, coverage, power consumption management, etc.

Therefore, a need exists for a computing unit that includes femtocell functionality and that addresses one or more of the above challenges and/or other femtocell technological challenges and/or deployment challenges.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE SEVERAL VIEWS OF THE DRAWING(S)

FIGS. 9A-9C are diagrams of example graphs of energy performance criteria in accordance with the invention;

FIG. 10 is a schematic block diagram of an embodiment of a handheld computing unit implementing a femtocell AP in accordance with the present invention;

DETAILED DESCRIPTION OF THE INVENTION

Figure 1:
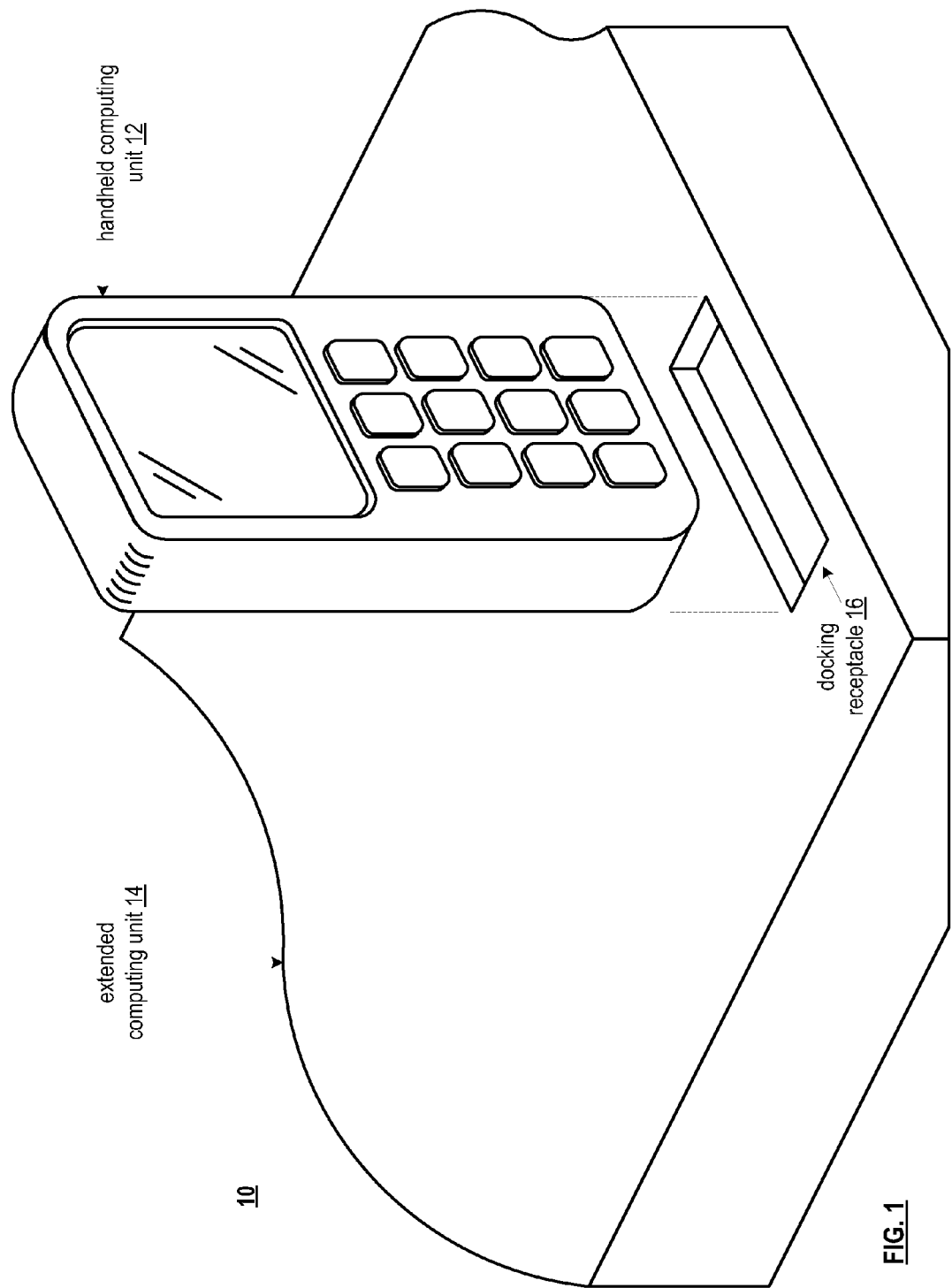
FIG. 1 is a block diagram of an embodiment of a computing device in accordance with the present invention.

FIG. 1 is a diagram of an embodiment of a computing device 10 that includes a handheld computing unit 12 and an extended computing unit 14. The handheld computing unit 12 may have a form factor similar to a cellular telephone, personal digital assistant, personal digital audio/video player, etc. and includes a connector structure that couples to a docketing receptacle 16 of the extended computing unit 14 (e.g., a docking interface). The connector structure and docketing receptacle may be wired (e.g., male and female connectors), wireless transceivers (e.g., Bluetooth, ZigBee, 60 GHz, etc.), and/or magnetic coils.

In general, the handheld computing unit 12 includes the primary processing module (e.g., central processing unit), the primary main memory, and the primary hard disk memory for the computing device 10. In this manner, the handheld computing unit 12 functions as the core of a personal computer (PC) or laptop computer when it is docked to the extended computing unit and functions as a cellular telephone, a GPS receiver, a personal digital audio player, a personal digital video player, a personal digital assistant, and/or other handheld electronic device when it is not docked to the extended computing unit. Further, the handheld computing unit 12 may function as a femtocell access point (AP) as will be discussed below with reference to FIGS. 2-17 when it is docked to the extended computing unit 14 and when it is not docked.

In addition, when the handheld computing unit 12 is docked to the extended computing unit 14, files and/or applications can be swapped therebetween. For example, assume that the user of the computing device 10 has created a presentation using presentation software and both reside in memory of the extended computing unit 14. The user may elect to transfer the presentation file and the presentation software to memory of the handheld computing unit 12. If the handheld computing unit 12 has sufficient memory to store the presentation file and application, then it is copied from the extended computing unit memory to the handheld computing unit memory. If there is not sufficient memory in the handheld computing unit, the user may transfer an application and/or file from the handheld computing unit memory to the extended computing unit memory to make room for the presentation file and application.

With the handheld computing unit 12 including the primary components for the computing device 10, there is only one copy of an application and/or of a file to support PC functionality, laptop functionality, and a plurality of handheld device functionality (e.g., TV, digital audio/video player, cell phone, PDA, GPS receiver, etc.). In addition, since only one copy of an application and/or of a file exists (other than desired backups), special software to transfer the applications and/or files from a PC to a handheld device is no longer needed. As such, the processing module, main memory, and I/O interfaces of the handheld computing unit 12 provide a single core architecture for a PC and/or a laptop, a cellular telephone, a PDA, a GPS receiver, a personal digital audio player, a personal digital video player, etc.

Figure 2:
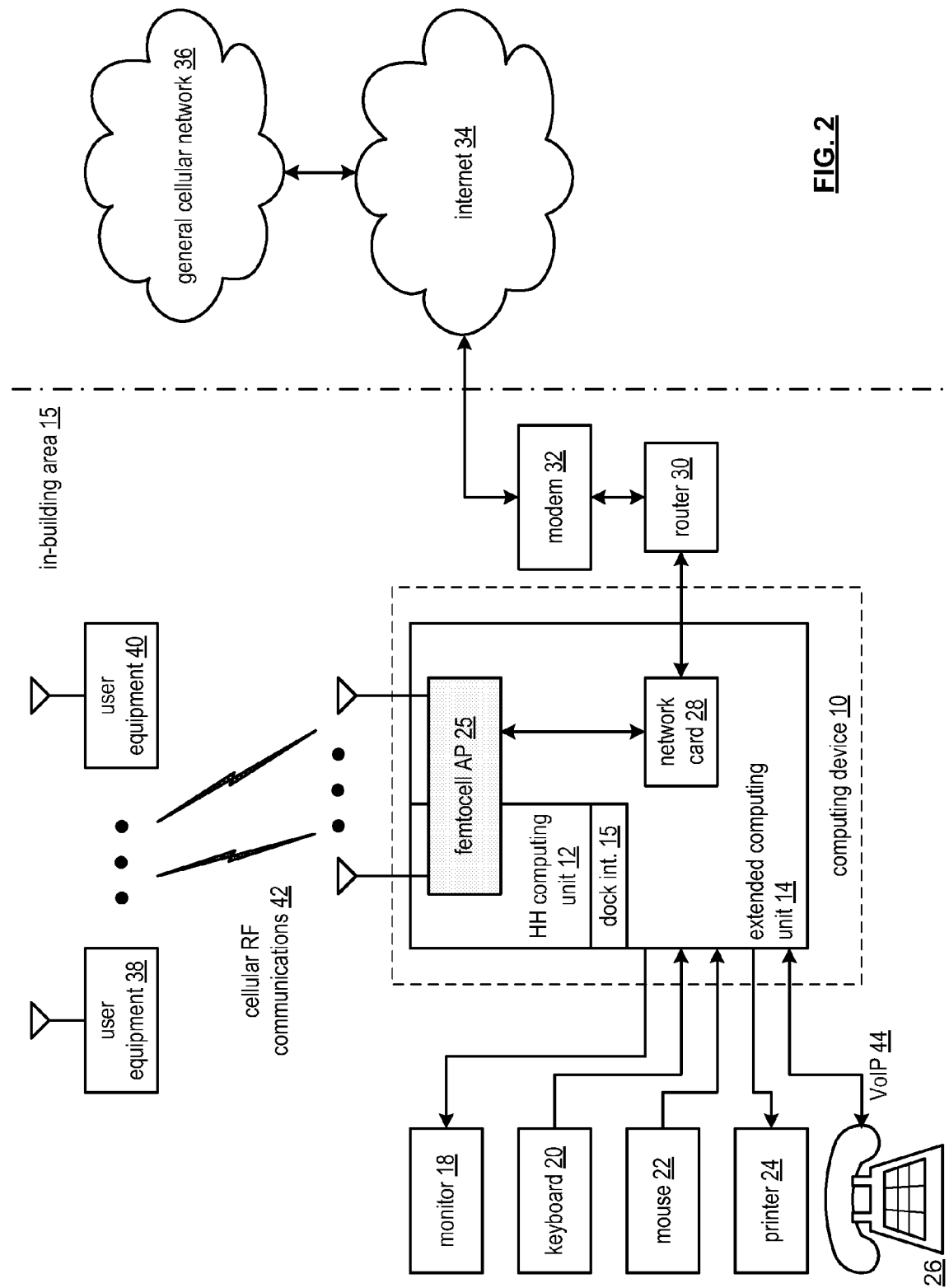
FIG. 2 is a schematic block diagram of an embodiment of a handheld computing unit coupled to an extended computing unit in accordance with the present invention.

FIG. 2 is a schematic block diagram of an embodiment of a computing device 10 that includes a handheld computing unit 12 coupled to an extended computing unit 14 via a docking interface 15. The extended computing unit 14 is coupled to one or more of a monitor 18, a keyboard 20, a mouse 22, a printer 24, and a voice over internet protocol (VoIP) phone 26 via one or more conventional interconnections. The extended computing unit 14 includes a network card 28 that is coupled to a modem 32 (e.g., DSL or cable) directly or via a router 30. Note that in another embodiment the modem could be wireless and/or the router could be wireless. The modem 32 is coupled to the internet 34, which is coupled to a general cellular network 36 (e.g., public switched telephone network, mobile core network for GSM, WCDMA, EDGE, UMTS, LTE, etc.). As such, the network card 28 may be coupled to the general cellular network 36 via a wired and/or wireless connection.

The handheld (HH) computing unit 12 and the extended (EXT) computing unit 14 collectively function as a femtocell access point (AP) 25 to support two or more user equipment 38-40 (e.g., a cellular telephone, push to talk radio, etc.). In this instance, the femtocell AP 25 communicates with the general cellular network 36 via the network card 28, the modem 32, and the internet 34. The femtocell AP 25 functions in accordance with the 3GPP (third generation partnership project) TR 25.xxx specifications for 3G (third generation) systems (e.g., WCDMA) and/or 3GPP TR 45.xxx specifications for GSM systems (e.g., GSM, EDGE, etc.) to support cellular communications of the user equipment 38-50. Details of the HH computing unit 12, the EXT computing unit 14, and the femtocell AP 25 will be provided with reference to at least some of FIGS. 3-17.

Figure 3:
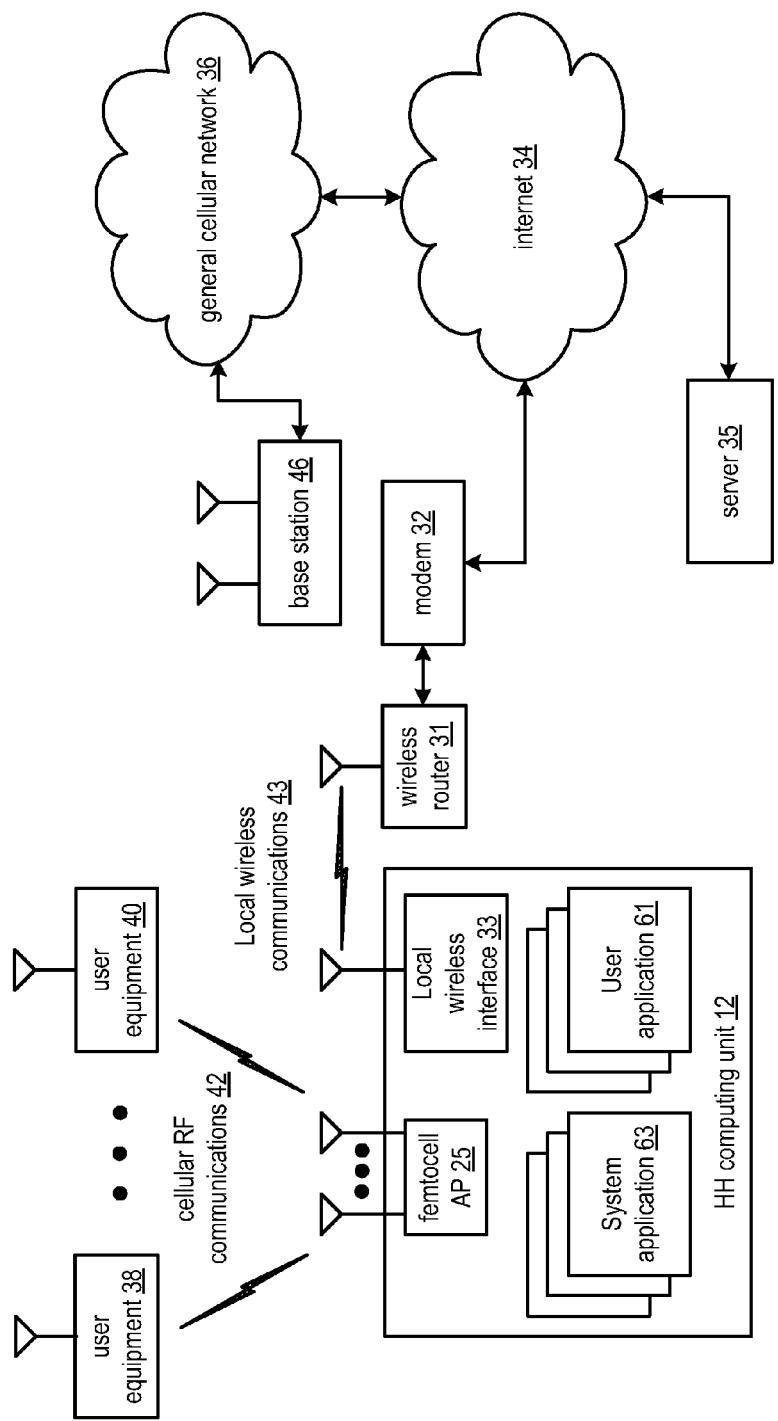
FIG. 3 is a schematic block diagram of an embodiment of a handheld computing unit implementing a femtocell AP in accordance with the present invention.

FIG. 3 is a schematic block diagram of an embodiment of a handheld computing unit 12 in a stand-alone mode implementing a femtocell AP 25 and executing one or more user applications 61 and/or one or more system applications 63. The user applications 61 may include word processing, spreadsheet processing, presentation processing, email, web browsing, database, calendar, video games, digital audio playback, digital video playback, digital audio record, digital video record, video games, contact management program, notes, web favorites, money management program, etc. The system applications 63 may include file storage, file retrieval, media conversion, display rendering, memory management, input/output handling, etc.

The handheld (HH) computing unit 12 provides femtocell AP functions to support one or more of the user equipment 38-40 in accordance with one or more femtocell protocols (e.g., 3GPP TR 25.xxx specifications for 3G systems (e.g., WCDMA) and/or 3GPP TR 45.xxx specifications for GSM systems (e.g., GSM, EDGE, etc.)). In this mode, the HH computing unit 12 communicates with the general cellular network 36 via the internet 34, the modem 32, and the wireless router 31. To facilitate such communications, the HH computing unit includes a local wireless interface 33 (which will be described in greater detail with reference to FIGS. 7 and 10-13) that communicates 43 with the wireless router 31.

Further, the HH computing unit 12 communicates with one or more of the user equipment 38-40 via conventional cellular RF communications 42. For instance, user equipment 38-40 registers with the general cellular network 36 through the HH computing unit 12 and communicates voice and data calls through the HH computing unit 12 to participate in cellular communications. The femtocell AP 25 operates in a similar fashion as a regular cellular base station 46 such that the user equipment 38-40 follows the same protocols.

In the stand-alone femtocell AP mode, the HH computing unit 12 is battery operated. As such, it has a finite amount of energy to perform the femtocell AP role and to execute the user applications 61 and/or system applications 63. When the HH computing unit has sufficient energy, it performs the femtocell AP role and executes the user applications and/or system applications 63 in a normal manner (e.g., conventional power savings techniques are used). In this state, handheld computing unit 12 performs the femtocell AP role by converting upstream user equipment signals into local wireless interface upstream signals (e.g., signals from the user equipment 38-40 to the network 36) and by converting local wireless interface downstream signals into downstream user equipment signals (e.g., signals from the network 36 to the user equipment 38-40).

When the energy of the HH computing unit 12 is less than sufficient, the HH computing unit 12 executes an energy adjustment algorithm. For example, less than sufficient energy may be indicated by a battery charge state (e.g., current capacity) that is at a level which is inadequate to power the current energy demand for a given duration. As another example, less than sufficient energy may be based on the battery capacity (e.g., how much energy the battery has when it is fully charged), a desired duration of operation, and the energy demand for the various operations to be executed by the HH computing unit. As a specific example of this, assume that it is desired to support femtocell AP operations and other handheld operations (e.g., user applications) for a duration of 120 minutes. If the energy demand for these operations will exhaust the fully charged battery in 90 minutes, then the energy is less than sufficient.

The energy adjustment algorithm may include off-loading one or more of the femtocell AP functions, utilize a reduced set of the femtocell AP functions, off-load one or more of the user applications 61 or system applications 63, and/or requesting coupling to an extended computing unit (e.g., to charge the battery and/or handle some of the femtocell traffic). For example, the algorithm may reduce the set of femtocell AP functions by limiting the number of users supported, by lowering the RF signal power levels to the users, and/or by restricting the types of cellular RF communications 42 (e.g., voice only, short message service only, no video, etc).

If the algorithm reduces energy demands by off-loading one or more femtocell AP functions, the HH computing unit determines which femtocell AP functions to off-load and to one or more external resources (e.g., base station 46, server 35, the extended computing unit 14, the wireless router 31, the modem 32). Such a determination is based on one or more of the energy demand of the function, the available energy, external resource availability (e.g., is capable of performing the function(s) and is available to perform the function(s)), and latency of the connection between the HH computing unit and the external resource. For example, the HH computing unit may off-load one or more of the steps of converting a LWI downstream signal into a downstream user equipment signal (note that these steps will be described in greater detail with reference to FIGS. 4, 7, and 10-13). As another example, the HH computing unit may off-load one or more steps of converting an upstream user equipment signal into an upstream LWI signal (note that these steps will also be described in greater detail with reference to FIGS. 4, 7, and 10-13).

Figure 4:
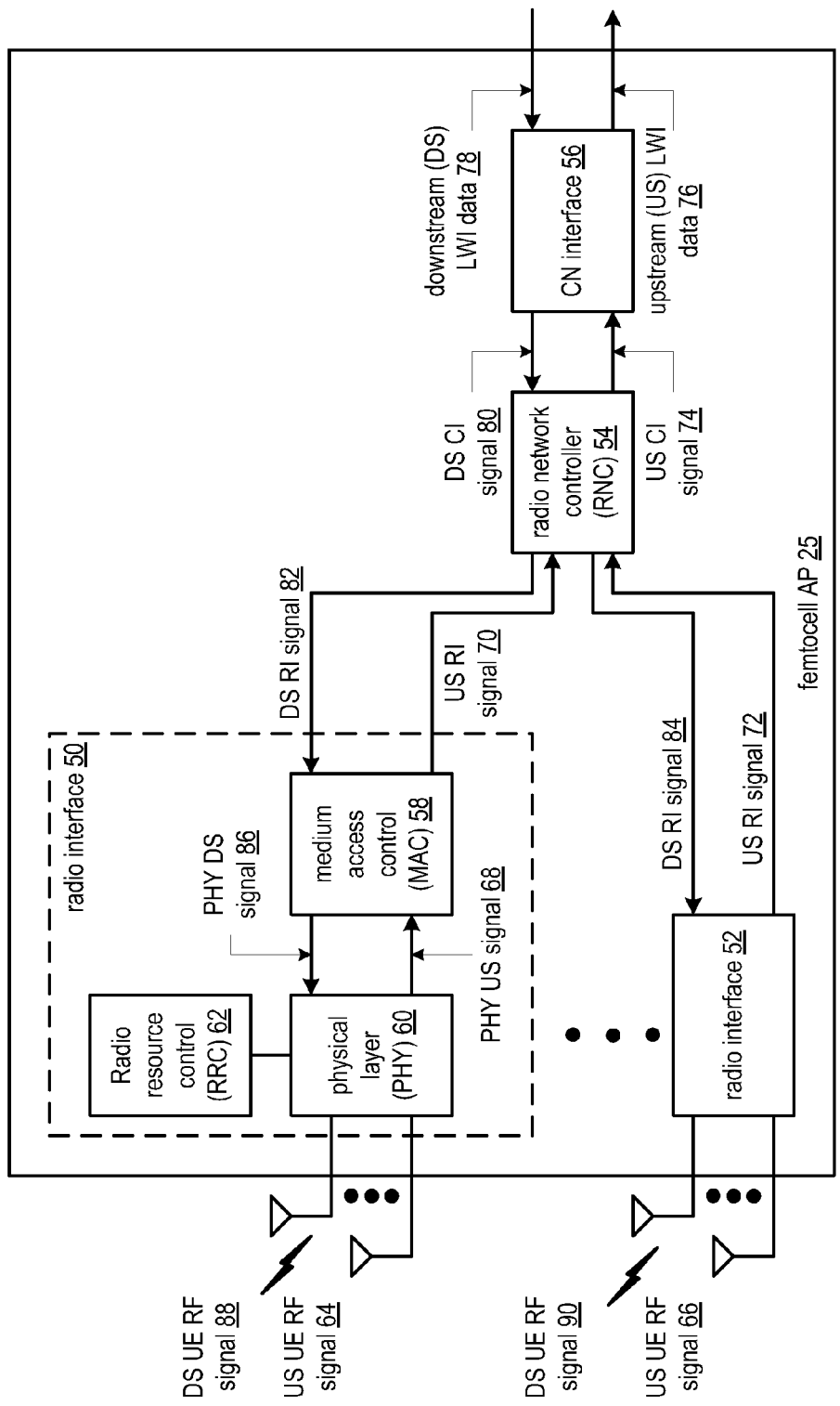
FIG. 4 is a schematic block diagram of an embodiment of a femtocell access point (AP) in accordance with the present invention.

FIG. 4 is a schematic block diagram of an embodiment of a femtocell access point (AP) 25 that includes a plurality of radio interfaces 50-52, a local radio network controller (RNC) 54, and a core network (CN) interface 56. Each of the radio interfaces 50-52 includes a medium access control (MAC) unit 58, a physical layer (PHY) unit 60, and a radio resource controller (RRC) 62.

In an example of operation, the CN interface 56 receives downstream (DS) local wireless interface (LWI) data 78 from an upstream network component (e.g., the general cellular network 36). The DS LWI data 78 is formatted in accordance with an internet protocol (IP) transmission scheme (e.g., TCP/IP, etc.). The content of the DS LWI data 78 includes user data and/or system data that is formatted in accordance with a particular cellular telephone interface protocol (e.g., 3GPP TS 25.410 UTRAN Iu Interface: General Aspects and Principles and other specifications referenced therein). The user data may be cellular network packets, or frames, of voice, text, data, video, audio, etc. The system data may include data for registering user equipment, resource allocation, resource management, etc. and is in accordance with one or more femtocell protocols (e.g., 3GPP TS 25.401 UTRAN overall description and specifications reference therein).

The CN interface 56 converts the DS LWI data 78 into a downstream (DS) CN interface (CI) signal 80. For example, the CN interface 56 recovers the content of the DS LWI data 78 by removing the IP transmission scheme overhead information. The CN interface provides the recovered DS CI signal 80 to the radio network controller (RNC) 54. Note that, in an embodiment, the CN interface 56 and the RNC 54 may collectively function as a HNB (Home Node B gateway).

The RNC 54 converts the DS CI signal 80 into one or more downstream (DS) radio interface (RI) signals 82-84. For instance, if the DS CI signal 80 includes user data and/or system data for more than one radio interface 50-52, then the RNC 54 partitions the signal for the respective radio interfaces 50-52. In general, the RNC 54 functions to perform at least a portion of radio resource management, mobility management, and encryption/decryption of data to/from the user equipment 38-40. Radio resource management includes one or more of outer loop power control, load control, admission control, packet scheduling, handover control, macro-diversity combining, securing functions, and mobility management for user equipment within the femtocell APs coverage area. Note that each of these RNC functions and sub-functions are separate functions that the HH computing unit may off-load when it is executing the energy adjustment algorithm.

The MAC unit 58 receives the DS RI signal 82 and converts it into a physical layer (PHY) downstream (DS) signal 86. This may be done in accordance with one or more femtocell protocols. For example, the MAC unit 58 may convert the DS RI signal 82 into the PHY DS signal 86 in accordance with the 3GPP TS 25.301: Radio Interface Protocol Architecture. Note that each MAC unit 58 is a separate function that the HH computing unit may off-load when it is executing the energy adjustment algorithm.

The PHY unit 60 converts the PHY DS signal 86 into a downstream (DS) user equipment (UE) radio frequency (RF) signal 88 in accordance with one or more femtocell protocols. For example, the PHY unit 60 may convert the PHY DS signal 86 into the DS UE RF signal 88 in accordance with the 3GPP TS 25.301: Radio Interface Protocol Architecture. Note that the PHY unit 60 includes a baseband processing module and an RF section.

Within a radio interface, the radio resource control (RRC) unit 62 provides network layer functionality for the radio interface 50-52. For example, the RRC unit 62 may process one or more of broadcast information related to non-access stratum, broadcast information related to access stratum, processing of an RRC connection, processing of radio bearers, processing radio resources for the RRC connection, performing RRC connection mobility functions, controlling requested quality of service, power control, processing initial cell selection and cell re-selection, arbitration of the radio resources on an uplink dedicate channel, RRC message integrity protection, cell broadcast service control, and multimedia broadcast multicast service control. Note that processing includes one or more of establishing, maintaining, reconfiguring, and releasing. Further note that functions performed by the RRC unit may be in accordance with one or more femtocell specifications (e.g., 3GPP TS 25.301: Radio Interface Protocol Architecture). Still further note that the RRC functions are separate functions that that the HH computing unit may off-load when it is executing the energy adjustment algorithm.

The PHY unit 60 also converts an upstream (US) user equipment (UE) RF signal 64 into a PHY US signal 68 in accordance with one or more femtocell protocols. The MAC unit 58 converts the PHY US signal 68 into a US RI signal 70 in accordance with one or more femtocell protocols (e.g., 3GPP TS 25.301: Radio Interface Protocol Architecture). Note that radio interface 52 converts a DS RI signal 84 into a DS UE RF signal 90 and converts a US UE RF signal 66 into a US RI signal 72 in a similar fashion as discussed with reference to radio interface 50.

The radio network controller (RNC) 54 converts the US RI signals 70-72 into a US CI signal 74 in accordance with one or more femtocell protocols (e.g., 3GPP TS 25.401 UTRAN overall description and specifications reference therein). The CN interface 56 converts the US CI signal 74 into a US LWI data 76. For example, the CN interface 56 formats the US CI signal 74 in accordance with an IP transmission scheme to produce the US LWI data 76. Note that the US CI signal 74 is formatted in accordance with a femtocell protocol (e.g., e.g., 3GPP TS 25.410 UTRAN Iu Interface: General Aspects and Principles and other specifications referenced therein).

Figure 5:
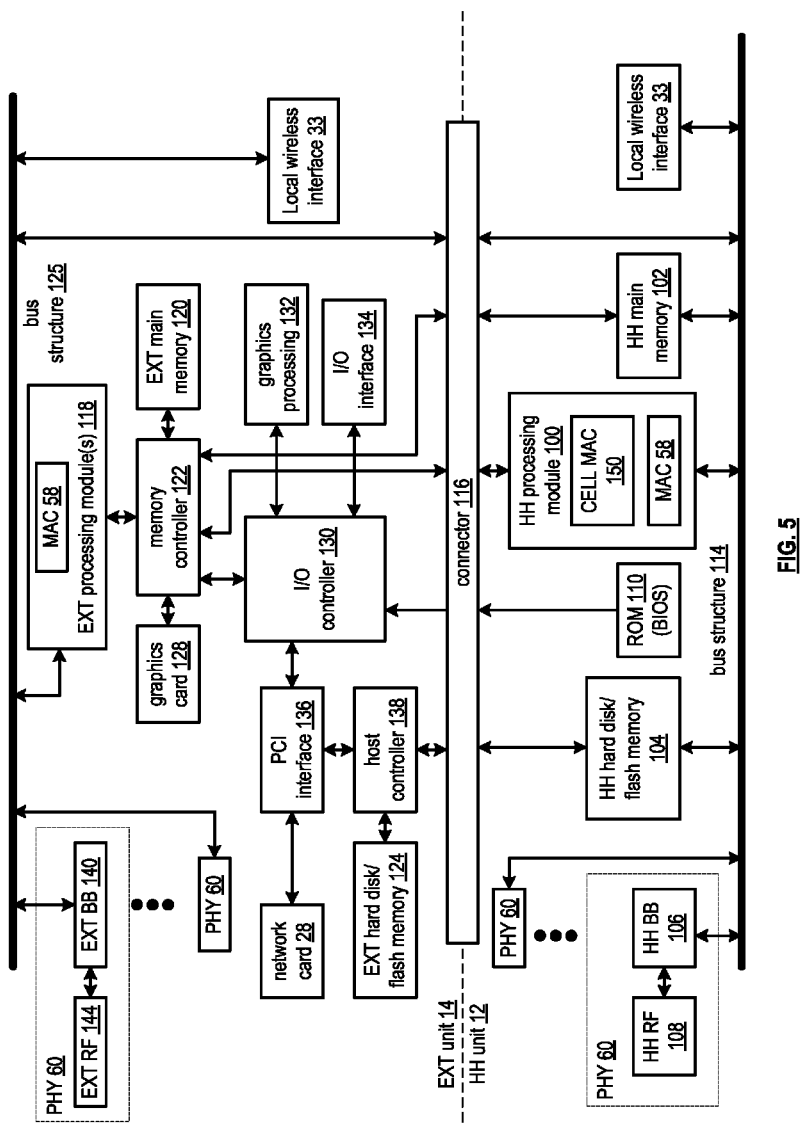
FIG. 5 is a schematic block diagram of an embodiment of a handheld computing unit and an extended computing unit in accordance with the present invention.

FIG. 5 is a schematic block diagram of an embodiment of core components of a handheld computing unit 12 coupled via connector 116 to an extended computing unit 14. The handheld (HH) computing unit 12 includes an HH processing module 100, an HH main memory 102, an HH hard disk/flash memory 104, a ROM 110, a local wireless interface (LWI) 33, a plurality of physical layer (PHY) units 60 (each of which includes a baseband processing module 106 and an RF section 108), and a bus structure 114. The extended (EXT) computing unit 14 includes a local wireless interface (LWI) 33, one or more EXT processing modules 118, an EXT main memory 120, a memory controller 122, a graphics card 128 and/or a graphics processing unit 132, an I/O controller 130, an I/O interface 134, a peripheral component interconnect (PCI) interface 136, a host controller 138, an EXT hard disk/flash memory 124, the network card 28, a bus structure 125, and a plurality of PHY units 60 (each of which includes an EXT baseband (BB) processing module 140-142 and an RF section 144-146).

The HH processing module 100, the baseband processing module 106 may be separate processing modules or the same processing module. A processing module may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module may have an associated memory and/or memory element, which may be a single memory device, a plurality of memory devices, and/or embedded circuitry of the processing module. Such a memory device may be a read-only memory, random access memory, volatile memory, non-volatile memory, static memory, dynamic memory, flash memory, cache memory, and/or any device that stores digital information. Note that when the processing module implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Further note that, the memory element stores, and the processing module executes, hard coded and/or operational instructions corresponding to at least some of the steps and/or functions illustrated in FIGS. 1-17.

The connector 116 provides the docking interface 15 between the HH and EXT computing units 12 and 14 and may include one or more wired connectors, one or more wireless interfaces, and/or one or more magnetic coupling interfaces. A wired connector may be a plug and socket connector, etc. A wireless interface may be supported by radio frequency (RF) and/or millimeter wave (MMW) transceivers that support one or more types of wireless communication protocols (e.g., Bluetooth, ZigBee, 802.11, 60 GHz, etc.). A magnetic coupling interface may be supported by transceivers with magnetic coils.

The bus structures 114 and 125 may each be wired and/or wireless buses. A wired bus may include 8 or more lines for data, for instructions, for control. A wireless bus may be implemented as an RF bus as described in co-pending patent application RF BUS CONTROLLER, having a filing date of Jan. 31, 2007, and a Ser. No. 11/700,285.

With handheld computing unit 12 docked to the extended computing unit 14, their components function as a single computing device 10. As such, when the computing device 10 is enabled, the BIOS stored on the HH ROM 110 is executed to boot up the computing device. The BIOS is discussed in greater detail with reference to FIGS. 19-26 of the parent patent application. After initializing the operating system, which is described in greater detail with reference to FIGS. 19-22 and 27-36 of the parent patent application, the computing device 10 is ready to execute an application (e.g., user application, system application, and/or femtocell AP).

In an embodiment, the memory controller 122 coordinates the reading data from and writing data to the HH main memory 102 and the EXT main memory 120, by the processing modules 100 and 118, by the user I/O devices coupled directly or indirectly to the I/O controller 130, by the graphics card 128, and/or for data transfers with the HH and/or EXT hard disk/flash memory 104 and/or 124. Note that if the HH main memory 102 and/or the EXT main memory include DRAM, the memory controller 122 includes logic circuitry to refresh the DRAM.

The I/O controller 130 provides access to the memory controller 122 for typically slower devices. For example, the I/O controller 130 provides functionality for the PCI bus via the PCI interface 136; for the I/O interface 134, which may provide the interface for the keyboard, mouse, printer, and/or a removable CD/DVD disk drive; and BIOS interface; a direct memory access (DMA) controller, interrupt controllers, a host controller, which allows direct attached of the EXT hard disk memory; a real time clock, an audio interface. The I/O controller 130 may also include support for an Ethernet network card, a Redundant Arrays of Inexpensive Disks (RAID), a USB interface, and/or FireWire.

The graphics processing unit (GPU) 132 is a dedicated graphics rendering device for manipulating and displaying computer graphics. In general, the GPU implements a number of graphics primitive operations and computations for rendering two-dimensional and/or three-dimensional computer graphics. Such computations may include texture mapping, rendering polygons, translating vertices, programmable shaders, aliasing, and very high-precision color spaces. The GPU 132 may a separate module on a video card or it may be incorporated into the graphics card 128 that couples to the memory controller 122. Note that a video card, or graphics accelerator, functions to generate the output images for the EXT display. In addition, the video card may further include functionality to support video capture, TV tuner adapter, MPEG-2 and MPEG-4 decoding or FireWire, mouse, light pen, joystick connectors, and/or connection to two monitors.

The EXT baseband processing modules 140-142 and the RF sections 144-146 are operable when the HH computing unit is docked to the EXT computing unit. Each of the RF sections 144-146 includes a receiver section and a transmitter section. When operable, each combination of the EXT baseband processing modules 140-142 and the RF sections 144-146 provides the PHY unit 60 of a radio interface 50 of the femtocell AP 25. For example, EXT BB processing module 140 and EXT RF section 144 may provide the PHY unit 60 of the radio interface servicing user equipment 38.

Similarly, each combination of the HH baseband processing modules 106 and HH RF sections 108 provides a PHY unit 60 of a radio interface 52 of the femtocell AP 25. For instance, when the handheld computing unit in a femtocell access point (AP) mode, an HH RF section 208 converts the upstream user equipment (UE) RF signal into an upstream UE symbol stream in accordance with a femtocell protocol (e.g., 3GPP TR 25.xxx specifications for 3G systems (e.g., WCDMA) and/or 3GPP TR 45.xxx specifications for GSM systems (e.g., GSM, EDGE, etc.)). The HH RF section 108 also converts a downstream UE symbol stream into the downstream UE RF signal in accordance with the femtocell protocol. The HH baseband processing module 106 performs baseband functions to convert the downstream PHY signal into the downstream UE symbol stream in accordance with the femtocell protocol and to convert the upstream UE symbol stream into the upstream PHY signal in accordance with the femtocell protocol.

The baseband functions for converting a downstream signal into a downstream symbol stream include one or more of scrambling, puncturing, encoding, interleaving, constellation mapping, modulation, frequency spreading, frequency hopping, beamforming, space-time-block encoding, space-frequency-block encoding, frequency to time domain conversion, and/or digital baseband to intermediate frequency conversion. The baseband functions for converting an upstream symbol stream into an upstream signals includes one or more of digital intermediate frequency to baseband conversion, time to frequency domain conversion, space-time-block decoding, space-frequency-block decoding, demodulation, frequency spread decoding, frequency hopping decoding, beamforming decoding, constellation demapping, deinterleaving, decoding, depuncturing, and/or descrambling.

Figure 6:
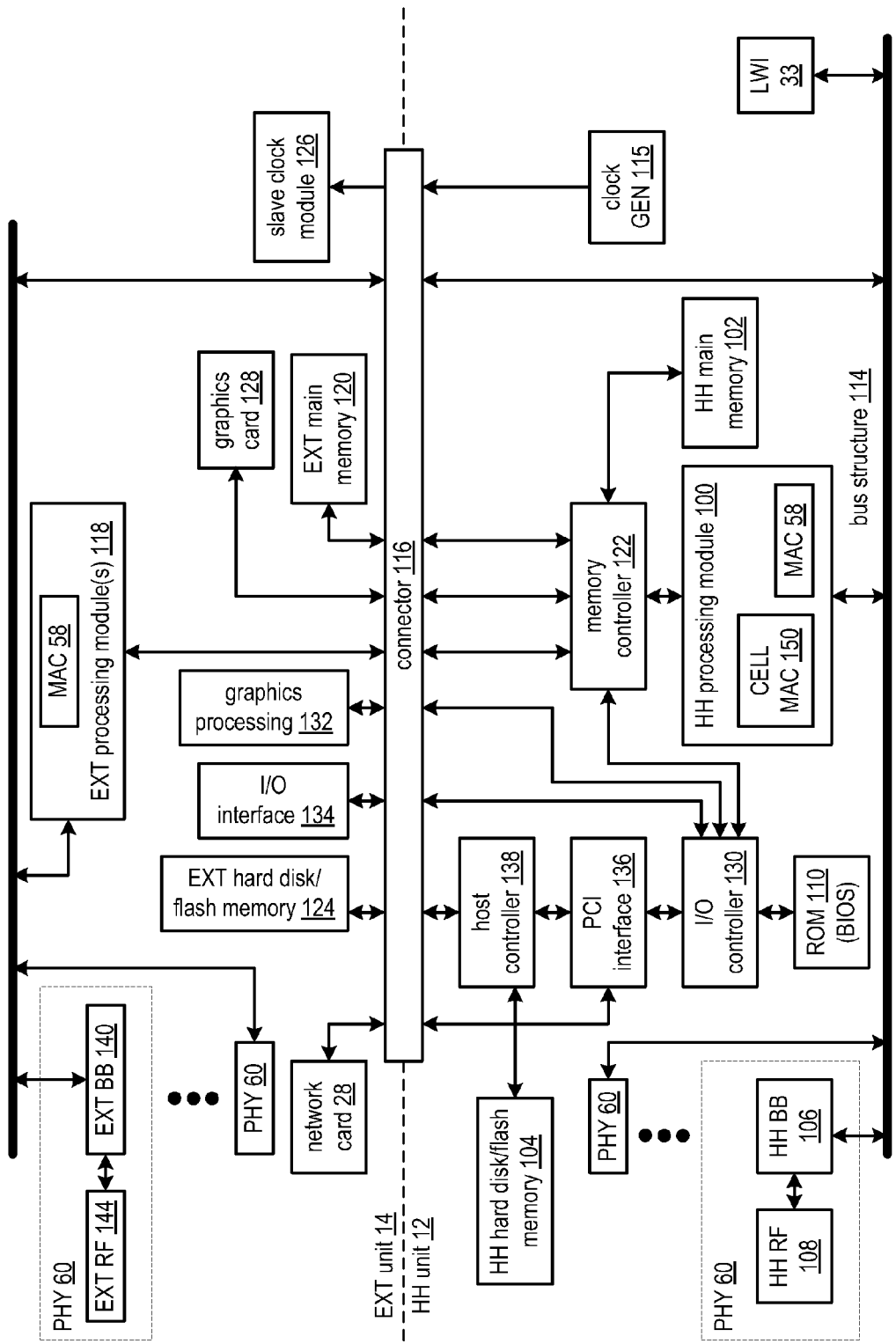
FIG. 6 is a schematic block diagram of another embodiment of a handheld computing unit and an extended computing unit in accordance with the present invention.

FIG. 6 is a schematic block diagram of another embodiment of core components of a handheld computing unit 12 coupled via connector 116 to an extended computing unit 14. The handheld (HH) computing unit 12 includes the HH processing module 100, the HH main memory 102, the host controller 138, the HH hard disk/flash memory 104, a plurality of PHY units 60 (e.g., a plurality of baseband processing modules 106 and a plurality of RF sections 108), the ROM 110, the bus structure 114, the memory controller 122, the I/O controller 130, the peripheral component interconnect (PCI) interface 136, the LWI 33, and the clock generation circuit 115. The extended (EXT) computing unit 14 includes the one or more EXT processing modules 118, the EXT main memory 120, the slave clock module 126, the graphics card 128 and/or the graphics processing unit 132, the I/O interface 134, the EXT hard disk/flash memory 124, the network card 28, the bus structure 125, and a plurality of PHY units 60 (e.g., the plurality of EXT baseband (BB) processing modules 140-142 and the plurality of RF sections 144-146).

In this embodiment, the HH unit 12 and the EXT unit 14 function as previously discussed to provide a femtocell AP 25. When the HH unit 12 is in a cellular mode (e.g., not docked to the EXT unit 14), the EXT unit 14 is disabled and the HH unit 12 provides cellular functions and other functions as discussed in the above referenced parent patent application.

Figure 7:
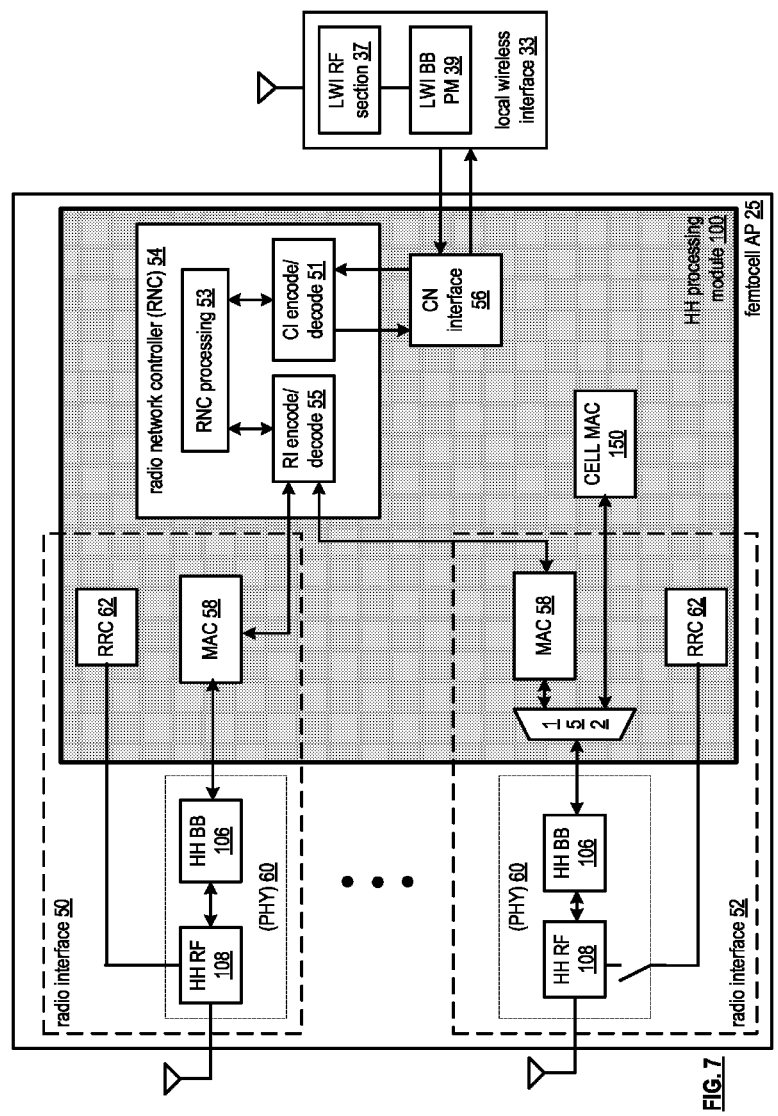
FIG. 7 is a schematic block diagram of another embodiment of a handheld computing unit implementing a femtocell AP in accordance with the present invention.

FIG. 7 is a schematic block diagram of another embodiment of a handheld (HH) computing unit 12 implementing a femtocell AP 25. The HH computing unit 12 components include the HH processing module 100, the HH baseband processing module 106, the HH RF section 108, and the local wireless interface (LWI) 33. The LWI 33 includes a LWI radio frequency (RF) section 37 and LWI baseband (BB) processing module (PM) 39.

The radio network controller (RNC) 54 includes a core network interface (CI) encode/decode 51 function, an RNC processing 53 function, and a radio interface (RI) encode/decode 55 function. In general, the CI encode/decode 51 function corresponds to formatting signals for the Iu interface with the core network, which may be done in accordance with one or more femtocell protocols (e.g., 3GPP TS 25.410: UTRAN Iu interface: General Aspects and Principles and other specifications referenced therein). The RI encode/decode 55 function corresponds to formatting signals for the Uu interface with the user equipment, which may be done in accordance with one or more femtocell protocols (e.g., 3GPP TS 25.301: Radio Interface Protocol Architectures and other specifications referenced therein). The RNC processing 53 function determines the execution sequencing of the RNC 54 tasks and routes processed data from one function to the next function.

In an example of operation, the HH computing unit 12 has sufficient energy to implement the femtocell AP 25. In this state, the HH computing unit registers the femtocell AP 25 and the user equipment 38-40 with the core network 36 in accordance with one or more femtocell protocols (e.g., 3GPP TS 25.467: UTRAN architecture for 3G Home Node B). After the registration processes, the femtocell AP 25 is ready to transceive user data and/or system data between the user equipment 38-40 and the core network 36. For user and/or system data from the user equipment, the receiver section of HH RF 108 function receives an upstream RF signal (e.g., signal 64 of FIG. 4) and amplifies it to produce an amplified upstream RF signal. The receiver section may then mix in-phase (I) and quadrature (Q) components of the amplified upstream RF signal with in-phase and quadrature components of a local oscillation to produce a mixed I signal and a mixed Q signal. The mixed I and Q signals are combined to produce an upstream symbol stream. In this embodiment, the upstream symbol may include phase information (e.g., $+/-\Delta\theta$ [phase shift] and/or $\theta(t)$ [phase modulation]) and/or frequency information (e.g., $+/-\Delta f$ [frequency shift] and/or $f(t)$ [frequency modulation]). In another embodiment and/or in furtherance of the preceding embodiment, the upstream RF signal includes amplitude information (e.g., $+/-\Delta A$ [amplitude shift] and/or $A(t)$ [amplitude modulation]). To recover the amplitude information, the receiver section includes an amplitude detector such as an envelope detector, a low pass filter, etc.

The HH BB 106 function converts the upstream symbol stream into the PHY upstream signal (e.g., signal 68 of FIG. 4) in accordance with one or more cellular communication standards (e.g., GSM, CDMA, WCDMA, HSUPA, HSDPA, EDGE, GPRS, LTE, UMTS, EV-DO, etc.). Such a conversion may include one or more of: digital intermediate frequency to baseband conversion, time to frequency domain conversion, space-time-block decoding, space-frequency-block decoding, demodulation, frequency spread decoding, frequency hopping decoding, beamforming decoding, constellation demapping, deinterleaving, decoding, depuncturing, and/or descrambling.

In addition, the HH BB 106 function, alone, in combination with the HH RF 108 function, and/or in combination with the HH processing module 100 facilitates one or more of macro-diversity distribution and combining; soft handover execution; error detection on transport channels; forward error correction encoding and decoding of the transport channels; multiplexing of the transport channels; demultiplexing of coded composite transport channels; rate matching of the coded transport channels to physical channels; mapping of the coded composite transport channels on the physical channels; power weighting and combining of the physical channels; modulation and spreading demodulation of the physical channels; de-spreading of the physical channels; frequency and time synchronization; beamforming; and Multiple Input Multiple Output (MIMO) transmission. Such additional functional processing is in accordance with one or more femtocell protocols (e.g., 3GPP TS 25.301: Radio Interface Protocol Architecture).

While the HH RF 108 function and the HH BB 106 function of radio interface 50 are converting upstream RF signals into upstream PHY signals, the HH RF 108 function and the HH BB 106 function of radio interface 52 are performing a similar function for another user equipment. The HH BB 106 function of radio interface 52 provides the upstream PHY signal to the MAC unit 58 via a multiplexer 152. The multiplexer 152 may be a logical multiplexer, a physical multiplexer, or a switching circuit that, when the computing unit is in the femtocell mode, the multiplexer 152 provides connectivity between the MAC unit 58 and the HH BB 106 function. When the computing unit is in the cellular mode, the multiplexer 152 provides connectivity between the CELL MAC unit 150 and the HH BB 106 function.

The HH processing module 100 implements the MAC units 58, which convert the PHY upstream signal into an upstream radio interface (RI) signal (e.g., signals 70 & 72 of FIG. 4) in accordance with one or more femtocell protocols (e.g., 3GPP TS 25.301: Radio Interface Protocol Architecture). The MAC units 58 provide the upstream RI signal to the RI encode/decode function 55 of RNC 54.

In general, the RI encoding/decoding function 55 corresponds to formatting and/or de-formatting signals for the Uu interface with the user equipment, which may be done in accordance with one or more femtocell protocols (e.g., 3GPP TS 25.301: Radio Interface Protocol Architectures and other specifications referenced therein). In this instance, the RI encoding/decoding function 55 is de-formatting the upstream RI signal and provides the de-formatted upstream signal to the RNC Processing function 53.

The RNC processing 53 function performs one or more RNC functions upon the decoded, or de-formatted, upstream RI signal to produce a processed upstream signal. Such RNC functions include radio resource management, mobility management, and encryption/decryption of data to/from the user equipment 38-40. Radio resource management includes one or more of outer loop power control, load control, admission control, packet scheduling, handover control, macro-diversity combining, securing functions, and mobility management for user equipment within the femtocell APs coverage area.

The RNC processing 53 function routes the processed upstream signal to the CI encode/decode 51 function, which converts the processed upstream signal into an upstream (US) core network interface (CI) signal (e.g., signal 74 of FIG. 4) in accordance with one or more femtocell protocols (e.g., 3GPP TS 25.410: UTRAN Iu interface: General Aspects and Principles and other specifications referenced therein). The CI encoding/decode function 51 provides upstream CI signal to the CN interfaces 56.

The CN interface 56 converts the US CI signal into a US core network (CN) signal (e.g., signal 76 of FIG. 4). For example, the CN interface 56 formats the US CI signal 74 in accordance with an IP transmission scheme to produce the US CN signal 76. Note that the US CI signal is formatted in accordance with a femtocell protocol (e.g., e.g., 3GPP TS 25.410 UTRAN Iu Interface: General Aspects and Principles and other specifications referenced therein). The CN interface 56 provides the upstream CN signal to the core network (e.g., the general cellular network 36) via the LWI 33.

For example, the LWI baseband processing module (BB PM) 39 converts the LWI upstream data (e.g., the upstream CN signal) into a modulated physical LWI upstream symbol stream. The LWI RF section 37 converts the LWI upstream symbol stream into an LWI upstream RF signal, which is provided to the wireless router and onto the core network. Note that the LWI 33 may generate the LWU upstream RF signal in accordance with one or more wireless communication protocols (e.g., IEEE 802.11n, 802.11g, 802.15, ZigBee, Bluetooth).

In the downstream direction, the LWI RF section 37 receives a LWI downstream RF signal from the core network via the wireless router and converts it into a physical LWI downstream symbol stream. The LWI BB PM 39 converts the downstream symbol stream into LWI downstream data, which it provides to the CN interface 56 as a downstream core network signal.

The CN interface 56 converts the DS CN signal (e.g., signal 78 of FIG. 4) into a downstream (DS) CN interface (CI) signal (e.g., signal 80 of FIG. 4). For example, the CN interface 56 recovers the content of the DS CN signal 78 by removing the IP transmission scheme overhead information. The CN interface provides the recovered DS CI signal to the CI encode/decode function 51 of the radio network controller (RNC) 54. The CI encode/decode 51 function decodes the DS CI signal in accordance with the femtocell protocol to produce a decoded DS CI data signal, which it provides to the RNC processing function 53.

The RNC processing 53 function performs one or more RNC functions upon the decoded DS CI data signal to produce a processed DS CI data signal. Such RNC functions include radio resource management, mobility management, and encryption/decryption of data to/from the user equipment 38-40. Radio resource management includes one or more of outer loop power control, load control, admission control, packet scheduling, handover control, macro-diversity combining, securing functions, and mobility management for user equipment within the femtocell APs coverage area.

The RNC processing 53 function routes the processed DS CI data signal to the RI encode/decode 55 function to encode the processed DS CI data signal in accordance with one or more femtocell protocols to produce the DS radio interface (RI) signals (e.g., signals 82-84 of FIG. 4). The encode/decode function 55 routes the encoded downstream signal to one or more of the radio interfaces as a downstream RI signal.

The MAC units 58 of the radio interfaces 50-52 convert their respective DS RI signal into a physical layer (PHY) downstream (DS) signal (e.g., signal 86 of FIG. 4). This may be done in accordance with one or more femtocell protocols. For example, the MAC unit 58 may convert the DS RI signal 82 into the PHY DS signal 86 in accordance with the 3GPP TS 25.301: Radio Interface Protocol Architecture.

The HH BB 106 function converts the DS PHY signal into a downstream symbol stream in accordance with one or more wireless communication standards (e.g., GSM, CDMA, WCDMA, HSUPA, HSDPA, EDGE, GPRS, LTE, UMTS, EV-DO, etc.). Such a conversion includes one or more of: scrambling, puncturing, encoding, interleaving, constellation mapping, modulation, frequency spreading, frequency hopping, beamforming, space-time-block encoding, space-frequency-block encoding, frequency to time domain conversion, and/or digital baseband to intermediate frequency conversion.

The transmitter section of HH RF 108 function converts the downstream symbol stream into a downstream RF signal that has a carrier frequency within a given frequency band (e.g., 900 MHz, 1800-2200 MHz, etc.). In an embodiment, this may be done by mixing the downstream symbol stream with a local oscillation to produce an up-converted signal. One or more power amplifiers and/or power amplifier drivers amplifies the up-converted signal, which may be RF bandpass filtered, to produce the downstream RF signal. In another embodiment, the transmitter section includes an oscillator that produces an oscillation. The downstream symbol stream provides phase information (e.g., $+/-\Delta\theta$[phase shift] and/or $\theta(t)$ [phase modulation]) that adjusts the phase of the oscillation to produce a phase adjusted RF signal, which is transmitted as the downstream RF signal. In another embodiment, the downstream symbol stream includes amplitude information (e.g., $A(t)$ [amplitude modulation]), which is used to adjust the amplitude of the phase adjusted RF signal to produce the downstream RF signal.

In yet another embodiment, the transmitter section includes an oscillator that produces an oscillation. The downstream symbol provides frequency information (e.g., $+/-\Delta f$ [frequency shift] and/or $f(t)$ [frequency modulation]) that adjusts the frequency of the oscillation to produce a frequency adjusted RF signal, which is transmitted as the downstream RF signal. In another embodiment, the downstream symbol stream includes amplitude information, which is used to adjust the amplitude of the frequency adjusted RF signal to produce the downstream RF signal. In a further embodiment, the transmitter section includes an oscillator that produces an oscillation. The downstream symbol provides amplitude information (e.g., $+/-\Delta A$ [amplitude shift] and/or $A(t)$ [amplitude modulation]) that adjusts the amplitude of the oscillation to produce the downstream RF signal.

When the handheld computing unit is in the cellular mode, the CN interface 56, the RNC 54, and the MAC units 58 are disabled. In the cellular mode, the components of the HH computing unit 12 function as a cellular telephone. In this mode, the CELL MAC unit 150 is active to provide one or more of the upper layer functions (e.g., data link, network, transport, session, presentation, and application) for upstream and/or downstream data (e.g., voice, text, audio, video, graphics, etc.). For instance, the CELL MAC unit 150 converts downstream data into a downstream cellular (CELL) PHY signal. The HH BB 106 function converts the downstream CELL PHY signal into a downstream CELL symbol stream. The HH RF 108 function converts the downstream CELL symbol stream into a downstream CELL RF signal.

The HH RF 108 function also converts an upstream (US) CELL RF signal into an US CELL symbol stream. The HH BB 106 function converts the UP CELL symbol stream into an US CELL PHY signal. The CELL MAC unit 150 converts the US CELL PHY signal into upstream data that is provided to memory for storage and/or to the IO devices for presentation (e.g., rendered audible and/or visible).

While the HH computing unit is supporting the femtocell AP operations, the HH processing module 100 may determine that it would more power efficient to utilize external resources to support any one or more of the femtocell AP functions. In this instance, the HH processing module 100 communicates with the external resources via the LWI 33 to provide the input data for a task and receive the results. Details of the femtocell AP function off-loading will be described in greater detail with reference to at least some of FIGS. 8-17.

Figure 8:
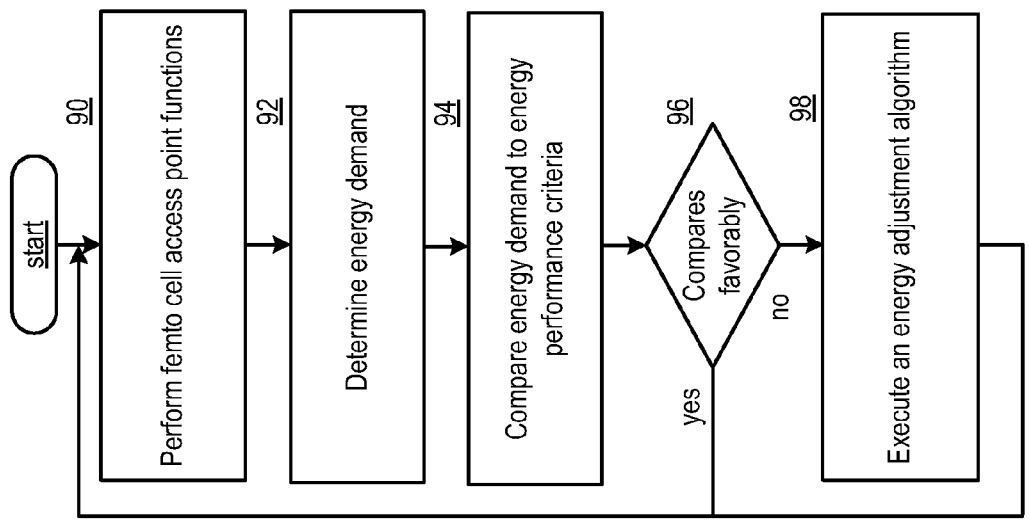
FIG. 8 is a logic diagram of an embodiment of a method for power management in accordance with the present invention.

FIG. 8 is a logic diagram of an embodiment of a method for power management that begins at step 90 where the HH processing module 100 perform one or more femtocell AP functions including facilitating the conversion of the LWI downstream data into one or more downstream PHY signals and conversion of one or more upstream PHY signals into the LWI upstream data. Details of the femtocell AP function were provided with reference to FIG. 7.

The method continues at step 92 where the HH processing module 100 determines the energy demand of the handheld computing unit 12. The energy demand corresponds to the cumulative power consumption of each of the current activities of the HH computing unit (e.g., femtocell AP functions, execution of one or more user applications, execution of one or more system applications, hardware elements, etc).

The method continues at step 94, where the HH processing module 100 determines whether the energy demand compares favorably with energy performance criteria. Energy performance criteria are one or more indications of acceptable level of power consumption for a given duration of time and/or for a given set of operations (e.g., femtocell AP functions, executing of user and/or system applications, etc.) and may vary over time as available power changes. For example, the energy performance criteria may specify to use at most an average of 2 watts of power for 60 minutes or to limit the internal power consumption to a peak instantaneous load of 3 watts when executing the given set of operations. Further examples of the energy performance criteria are provided with reference to FIGS. 9A-9C.

When the comparison at step 96 is favorable, the method repeats at step 90. When the comparison at step 96 is not favorable, the method continues at step 98 where the HH processing module 100 executes an energy adjustment algorithm. In general, the energy adjustment algorithm addresses the energy demand of the HH computing unit such that the energy performance criteria are met. In an embodiment, the energy adjustment algorithm includes off-loading one or more of the femtocell AP functions, utilizing a reduced set of the femtocell AP functions and/or requesting coupling to an extended computing unit. As such, the energy adjustment algorithm reduces the energy demand on the HH computing unit battery by off-loading some of the femtocell AP functions to external resources, by reducing the number of users it will support, and/or by reducing the set of femtocell AP functions it performs, (e.g., restrict types of communications, restrict data rate of communications, restrict quality of service, etc.). If the algorithm calls for coupling to an extended computing unit 14, the extended computing unit provides the power for the femtocell AP operations and provides a battery charger function for the HH computing unit. In this instance, the battery capacity of the HH computing unit is rendered moot.

In another embodiment, the HH processing module 100 determines the femtocell AP functions to off-load based on individual energy performance of the femtocell AP functions and the availability of capable external resources. For example, the HH computing unit maintains a list of average power requirements for at least some of the femtocell AP functions. The power requirements may be determined based on past averages and/or based on estimated future use when considering the task demands (e.g., how processor intensive the tasks will be and the corresponding power requirements). In addition, the HH computing unit maintains a list of external resources that are capable of performing one or more of the femtocell AP functions. The list may also include latency times between the HH computing unit and the corresponding external resource.

In yet another embodiment, the HH processing module 100 determines which femtocell AP functions to off-load to particular external resources by a query-response communication with external resources, by accessing a look up table (e.g., a list), a prioritization scheme, and/or network messaging (e.g., a message for the general cellular network 36 indicating which femtocell AP functions to off-load and to which external resources). For example, the query-response communication may identify available external processing resources by requesting their status while a look up table may identify external processing resources that are normally available or preferred. In addition or as an alternative, a prioritization scheme may be used to match resources to specific functions. For example, a remote server 35 with a very low latency communication path to the HH computing unit 100 may be preferred for the most processing intensive femtocell AP functions.

FIG. 9A is a diagram of an example graph of energy performance criteria indicating a relationship between available power and percentage of the femtocell AP functions being executed by the handheld computing unit. In this regard, at one extreme there may be no available power left if 100% of the femtocell AP functions are active (e.g., at full load) while at another extreme 100% of the power is available when there are no active femtocell AP functions (e.g., off-line state). This graph may be referenced when activating a new function to determine whether the new function can be executed and remain under the curve (e.g., the line shown).

FIG. 9B is a diagram of an example graph of energy performance criteria indicating a relationship between femtocell AP load and battery life. In this example graph, the battery life will be short if the load is high and the battery life will be long if the load is low. This graph may be referenced when changing the load to estimate the remaining battery life.

FIG. 9C is a diagram of an example graph of energy performance criteria indicating a relationship between available power and load demand. This graph may be referenced to determine when to off-load functions. In this example, when the power demand rises from zero the corresponding power supplied may rise at a linear fashion as shown until a high demand limit 160 is reached. Up to that point the power supplied was less than a high supplied limit 164 so that no off-loading is required 166. As the power demand rises further the offload 168 region is entered where no additional power is available to source the further power demands of the femtocell AP. As such, the power is supplied by the external resources where the functions are off-loaded.

FIG. 10 is a schematic block diagram of an embodiment of a handheld computing unit 12 implementing a femtocell AP 25. The HH computing unit 12 components include the HH processing module 100, the HH baseband processing module 106, the HH RF section 108, and the local wireless interface (LWI) 33. In this embodiment, the HH processing module 100 implements the radio network controller (RNC) 54, the cellular (CELL) MAC unit 150, for radio interface 52, the MAC units 58 for radio interfaces 50-52, and the radio resource control (RRC) units 62 for the radio interfaces 50-52. The CN interface 56 function is off-loaded to an external resource 170. The external resource 170 may be a server 35, a base station 46, and/or another suitable resource capable of executing the CN interface 56 function.

In this embodiment, the CN interface 56 is off-load to reduce power demands on the HH computing unit in accordance with the energy adjustment algorithm. With the CN interface off-loaded, the local wireless interface (LWI) 33 receives the downstream (DS) core network interface (CI) signal (e.g., signal 80 of FIG. 4) from the RNC 54 and, through the wireless router, modem and internet or a portion thereof, provides it to the CN interface 56 being executed by the external resource 170. The LWI 33 also receives an upstream CI signal from the CN interface 56 of external resource 170 via the wireless router, the modem, and/or the internet, and provides the upstream CI signal (e.g., signal 74 of FIG. 4) to the RNC 54. The remainder of the signal processing is as described with reference to FIGS. 4 and 7.

Figure 11:
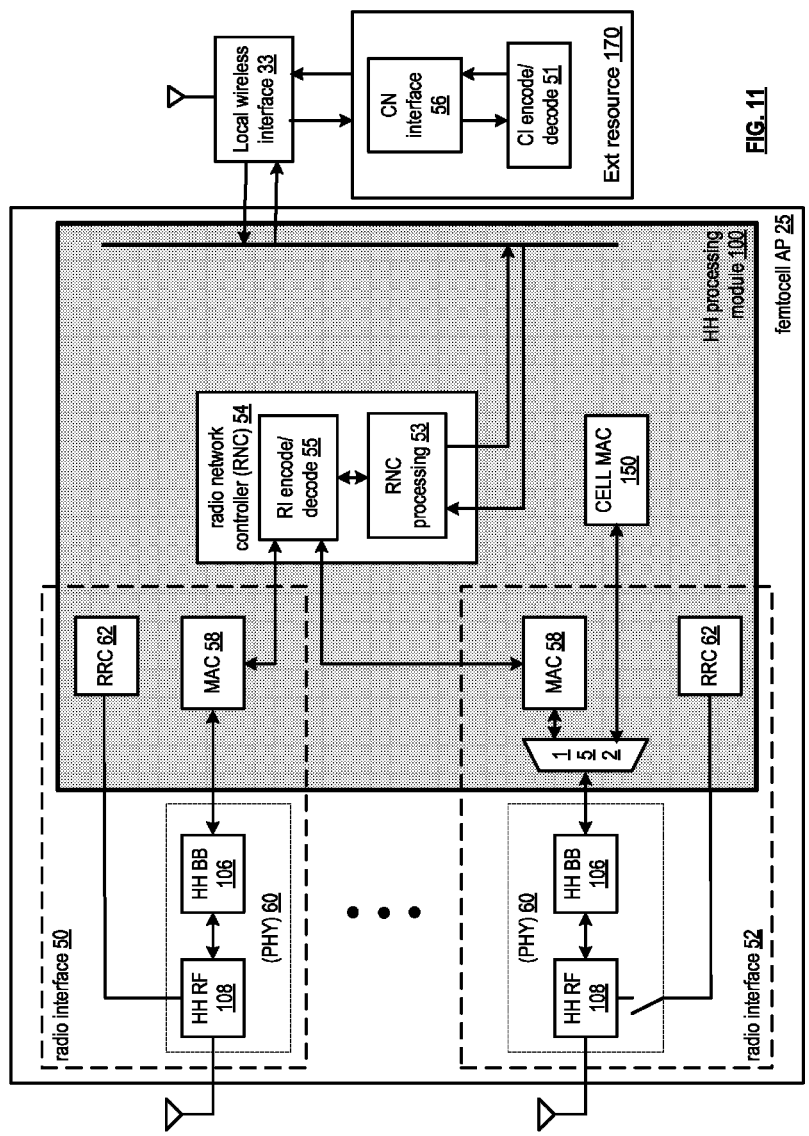
FIG. 11 is a schematic block diagram of another embodiment of a handheld computing unit implementing a femtocell AP in accordance with the present invention.

FIG. 11 is a schematic block diagram of another embodiment of a handheld computing unit 12 implementing a femtocell AP 25. The HH computing unit 12 components include the HH processing module 100, the HH baseband processing module 106, the HH RF section 108, and the local wireless interface (LWI) 33. In this embodiment, the HH processing module 100 implements the CN interface 56, the radio network controller (RNC) processing 53 function for the RNC 54, the cellular (CELL) MAC unit 150 for radio interface 52, the MAC units 58 for radio interfaces 50-52, and the radio resource control (RRC) units 62 for the radio interfaces 50-52. The CI encode/decode 51 function and the CN interface 56 have been off-loaded to an external resource 170.

In an embodiment, the CI encode/decode 51 function and the CN interface 56 are off-load to reduce power demands on the HH computing unit in accordance with the energy adjustment algorithm. With the CN interface 56 and CI encode/decode function 51 off-loaded, the local wireless interface (LWI) 33 receives the non-coded downstream (DS) core network interface (CI) signal (e.g., signal 80 of FIG. 4) from the RNC processing function 53 and, through the wireless router, modem and internet or a portion thereof, provides it to CI encode/decode function 51 for encoding and the CN interface 56, which are being executed by the external resource 170. The LWI 33 also receives a decoded upstream CI signal from the CI encode/decode function 51 of external resource 170 via the wireless router, the modem, and/or the internet, and provides the upstream CI signal (e.g., signal 74 of FIG. 4) to the RNC processing function 53. The remainder of the signal processing is as described with reference to FIGS. 4 and 7.

Figure 12:
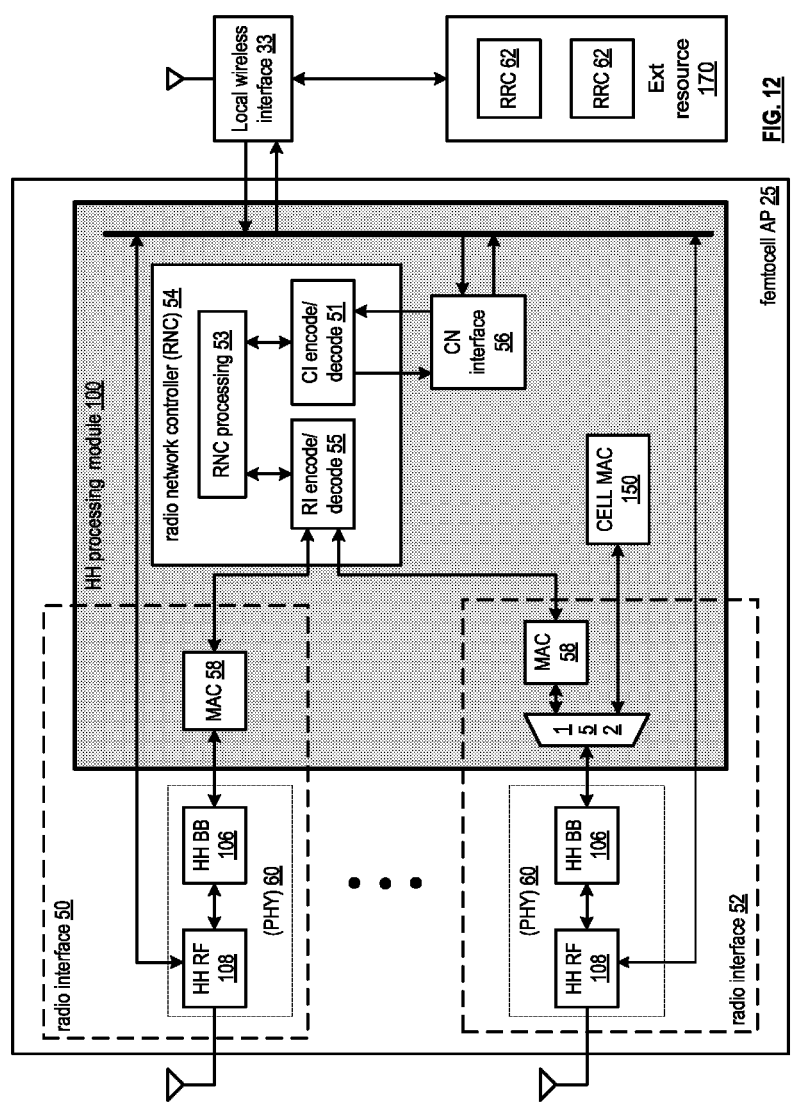
FIG. 12 is a schematic block diagram of another embodiment of a handheld computing unit implementing a femtocell AP in accordance with the present invention.

FIG. 12 is a schematic block diagram of another embodiment of a handheld computing unit 12 implementing a femtocell AP 25. The HH computing unit 12 components include the HH processing module 100, the HH baseband processing module 106, the HH RF section 108, and the local wireless interface (LWI) 33. In this embodiment, the HH processing module 100 implements the CN interface 56 function, radio network controller processing (RNC) 53 function, the CI encode/decode 51 function, the RI encode/decode 55 function, the cellular (CELL) MAC unit 150 for radio interface 52, and the MAC unit 58 for radio interfaces 50, 52. In this embodiment, the radio resource control (RRC) units 62 for the radio interfaces 50-52 has been off-loaded to an external resource 170.

Figure 13:
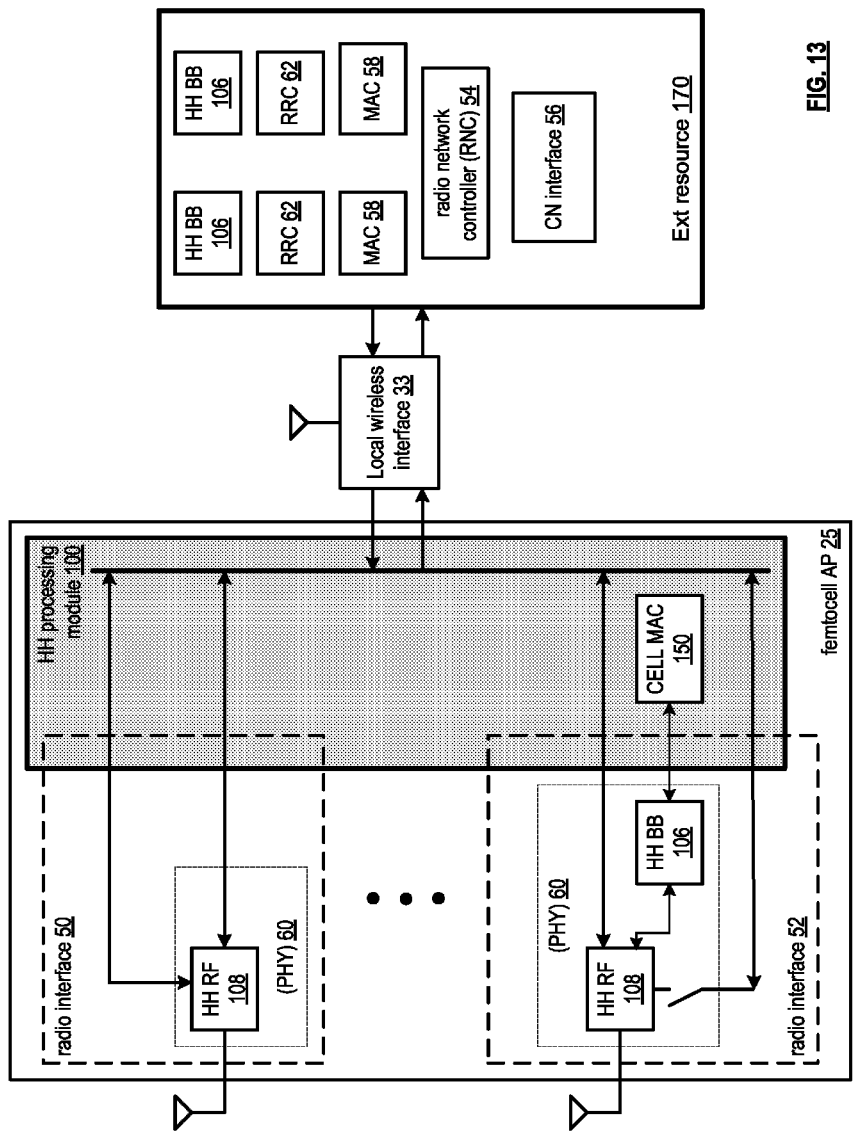
FIG. 13 is a schematic block diagram of another embodiment of a handheld computing unit implementing a femtocell AP in accordance with the present invention.

FIG. 13 is a schematic block diagram of another embodiment of a handheld computing unit 12 implementing a femtocell AP 25. The HH computing unit 12 components include the HH processing module 100, the HH baseband processing module 106 (for CELL MAC only), the HH RF section 108, and the local wireless interface (LWI) 33. In this embodiment, the HH processing module 100 implements the cellular (CELL) MAC unit 150 for radio interface 52. In this embodiment, the CN interface 56 function, RNC 54 function, MAC 58 functions, RRC 62 functions, and HH BB 106 functions have been off-loaded to an external resource 170.

Figure 14:
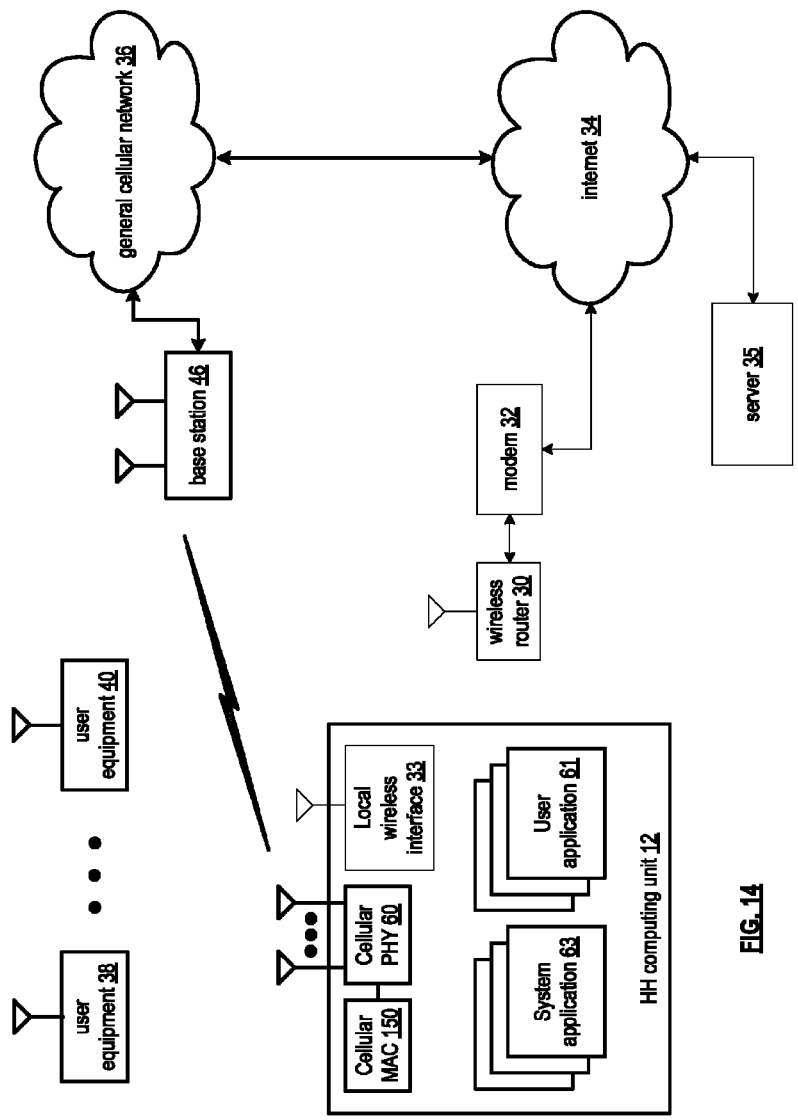
FIG. 14 is a schematic block diagram of an embodiment of a handheld computing unit in a cellular mode in accordance with the present invention.

FIG. 14 is a schematic block diagram of an embodiment of a handheld computing unit 12 in a cellular mode. The handheld computing unit 12 includes the cellular MAC 150, the cellular PHY 60, the LWI 33, one or more system applications 63 and one or more user applications 61. The HH computing unit 12 is not coupled to the extended computing unit 14 and is not operating as a femtocell AP. In this instance, the femtocell AP 25 is inactive and the HH computing unit 12 functions in a stand-alone mode as disclosed in the above referenced parent patent application. Accordingly, if the HH computing unit 12 desires to participate in a cellular communication, it registers and communicates with a base station 46. Similarly, user equipment 38-40 registers and communicates with base station 46 to participate in cellular communications.

In an example of operation, the cellular PHY 60 converts a downstream cell RF signal from bases station 46 into a downstream cell symbol stream and then into a downstream CELL PHY signal in accordance with a cellular communication protocol. The cellular MAC 150 converts the downstream CELL PHY signal into downstream MAC data for further processing by the HH computing unit 12.

In another example of operation, the cellular MAC 150 converts an upstream MAC data into an upstream CELL PHY signal. The cellular PHY 60 converts the upstream CELL PHY signal into an upstream CELL symbol stream and then into an upstream CELL RF signal for transmission to the base station 46 in accordance with a cellular communication protocol.

Figure 15:
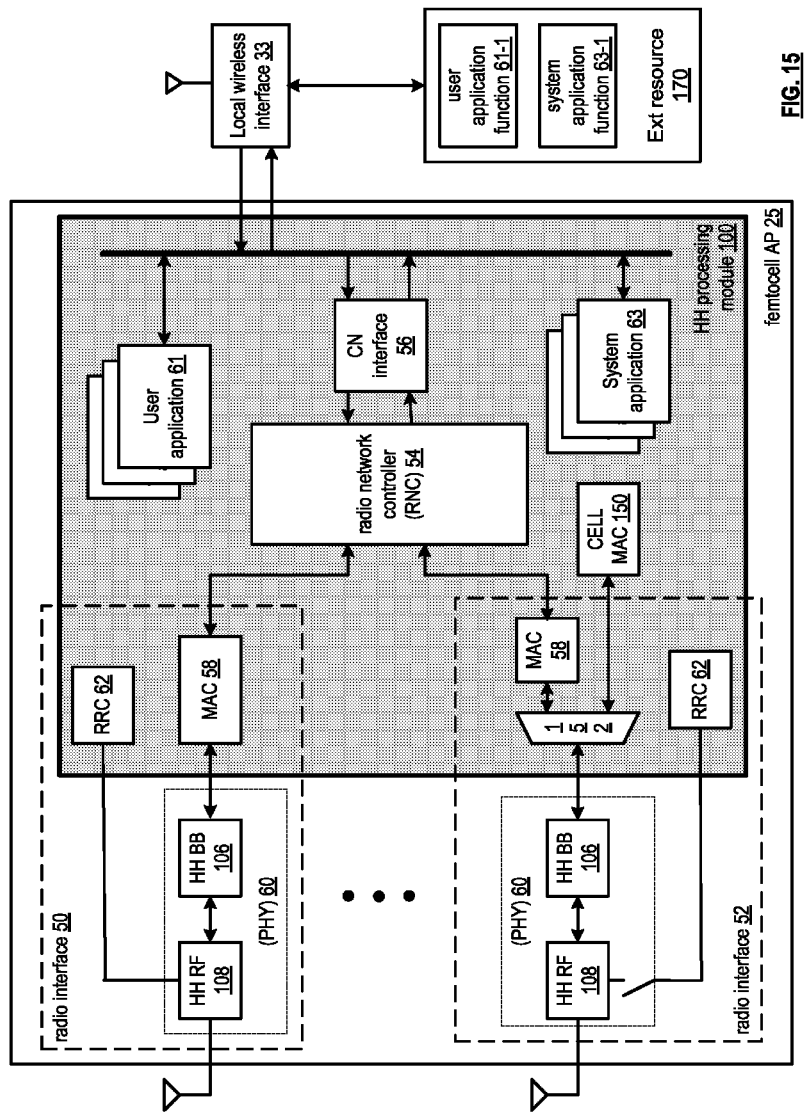
FIG. 15 is a schematic block diagram of another embodiment of a handheld computing unit implementing a femtocell AP in accordance with the present invention.

FIG. 15 is a schematic block diagram of another embodiment of a handheld computing unit 12 implementing a femtocell AP 25. The HH computing unit 12 components include the HH processing module 100, the HH baseband processing module 106, the HH RF section 108, and the local wireless interface (LWI) 33. In this embodiment, the HH processing module 100 implements the radio network controller (RNC) 54 function, the CN interface 56 function, the cellular (CELL) MAC unit 150 for radio interface 52, the MAC unit 58 for radio interfaces 50, 52, the radio resource control (RRC) unit 62 for the radio interfaces 50, 52, the user applications 61, and the system applications 63. In accordance with the energy adjustment algorithm, a user application, or portion thereof, 61-1 and a system application, or portion thereof, 63-1 are off-loaded to an external resource 170.

Figure 16:
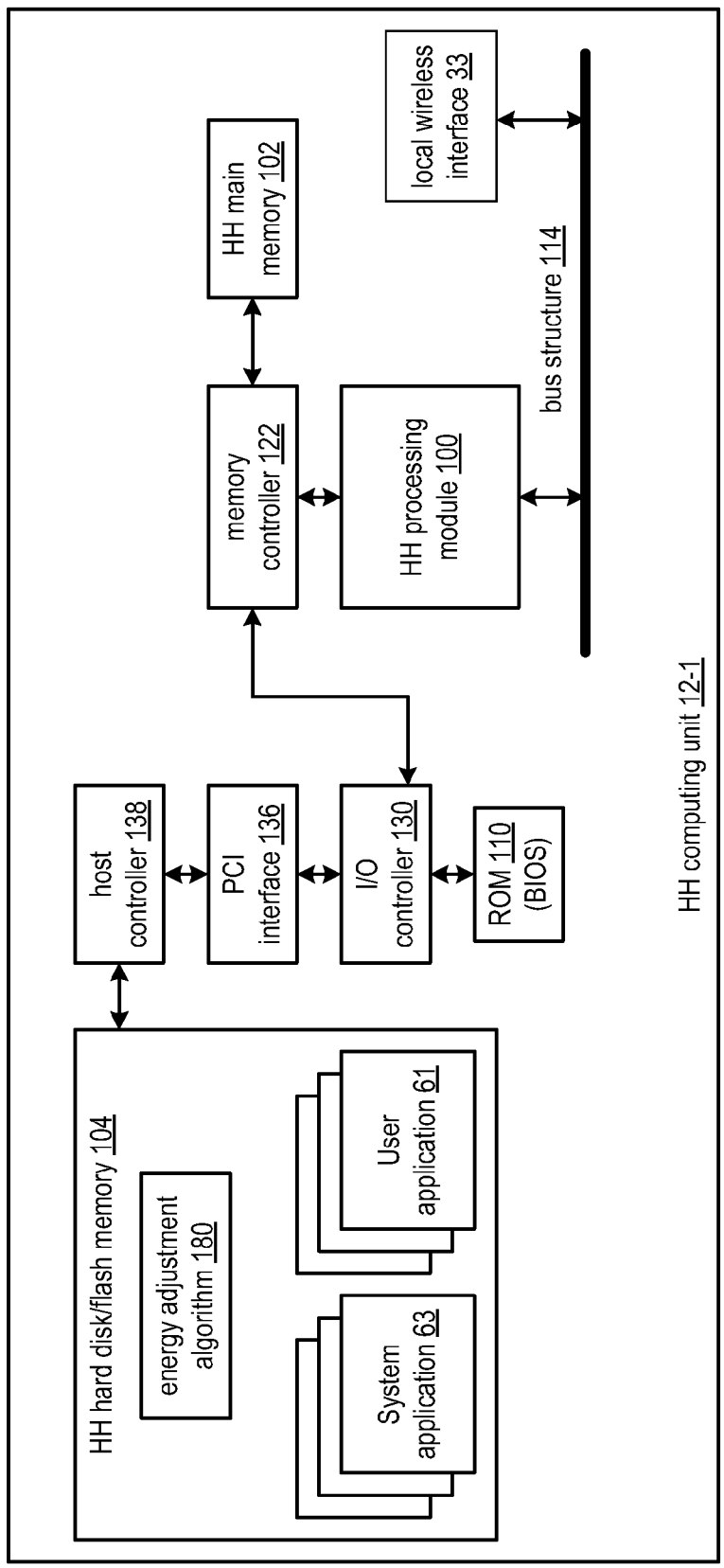
FIG. 16 is a schematic block diagram of another embodiment of a handheld computing unit in accordance with the present invention.

FIG. 16 is a schematic block diagram of another embodiment of a handheld computing unit 12-1 that includes the HH processing module 100, the LWI 33 coupled to the HH processing module 100 via a bus structure 114, the memory controller 122, the HH main memory 102, the I/O controller 130, the ROM 110, the PCI interface 136, the host controller 138, and the HH hard disk/flash memory 104.

In this embodiment, the HH hard disk/flash memory 104 includes user applications 61, system applications 63, and an energy adjustment algorithm 180. The HH processing module 100 can access the algorithm and applications stored on the HH hard disk/flash memory 104 to execute their functionality.

In an example of operation, LWI 33 converts LWI upstream data into the LWI upstream symbol stream and then into the LWI upstream RF signal in accordance with a local wireless interface protocol. In another example of operation, LWI 33 converts the LWI downstream RF signal into the LWI downstream symbol stream and then into the LWI downstream data in accordance with the local wireless interface protocol.

In an example of operation, HH processing module 100 determines whether the energy demand when performing the application functions compares unfavorably to energy performance criteria. When HH processing module 100 determines the energy demand compares unfavorably to the energy performance criteria, the HH processing module 100 executes an energy adjustment algorithm 180 to determine whether to off-load one or more of the application functions, utilize a reduced set of applications, or to utilize a reduced set of application functions. Examples of application functions include protocol conversions, file conversions, memory management, and/or any other element of one or more applications. When the HH processing module 100 offloads one or more of the application functions, the HH processing module 100 converts input content of the one or more of the application functions into the LWI upstream data and the HH processing module 100 converts the LWI downstream data into output content of the one or more of the application functions.

In another embodiment, the HH processing module 100 determines one or more of the application functions (e.g., sub-routines of an application) to off-load based on individual energy performance of the application functions. The HH processing module 100 may determine the energy performance criteria based on the relationship between available power and percentage of the application functions being executed by the handheld computing unit, the relationship between load and battery life, the relationship between available power and load demand, power source capabilities, power requirements for each of the application functions, and/or any other criteria to assess the energy performance criteria.

In yet another embodiment, the HH processing module 100 determines one or more external processing resources to perform the one or more of the application functions based on at least one of: a query-response communication, a look up table, a prioritization scheme, and network messaging.

Figure 17:
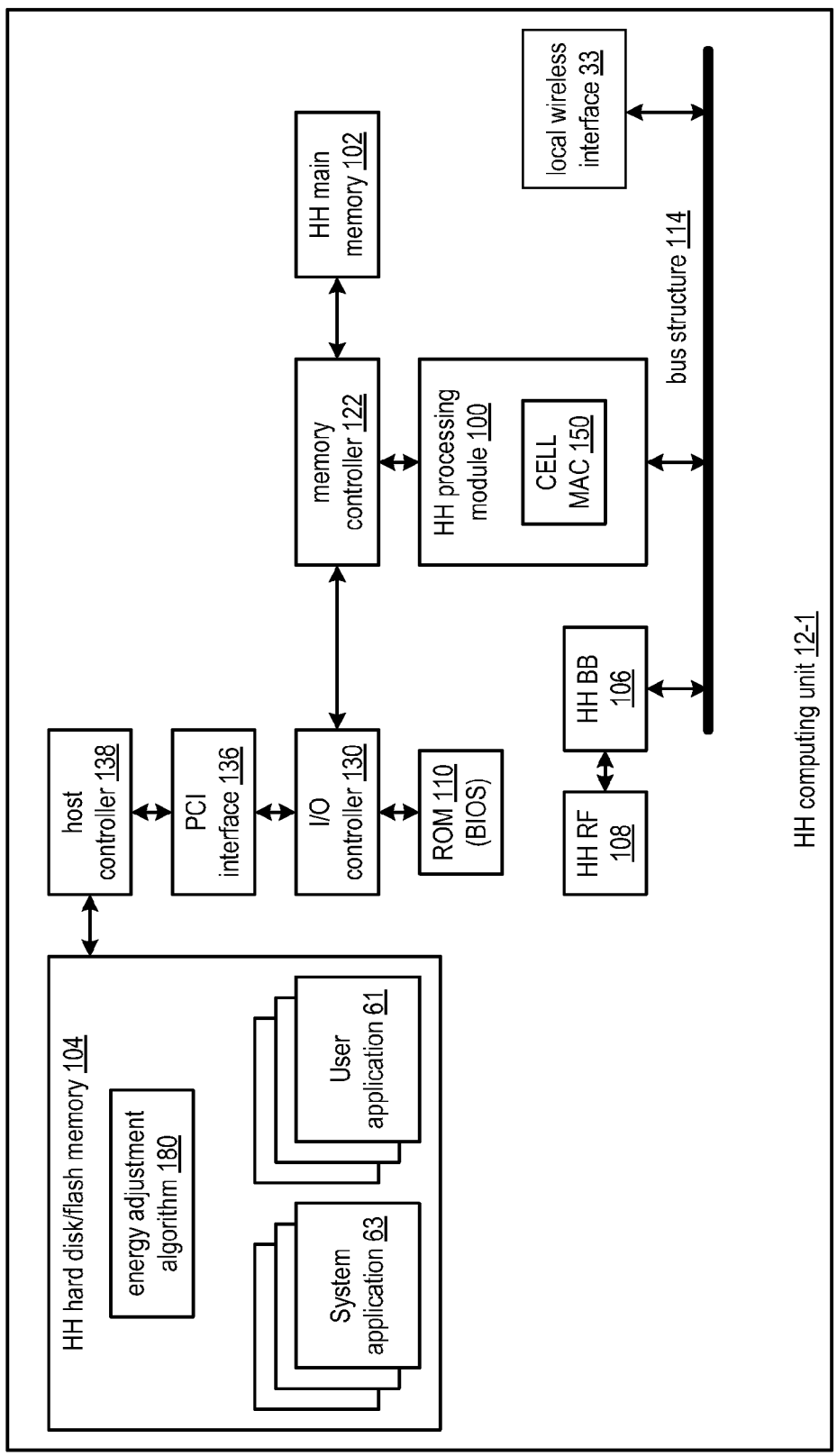
FIG. 17 is a schematic block diagram of another embodiment of a handheld computing unit in accordance with the present invention.

FIG. 17 is a schematic block diagram of another embodiment of a handheld computing unit 12-1 that includes the HH processing module 100, the LWI 33, the bus structure 114, HH RF 108, the HH BB 106, the memory controller 122, the HH main memory 102, the I/O controller 130, the ROM 110, the PCI interface 136, the host controller 138, and the HH hard disk/flash memory 104.

In an embodiment, the HH hard disk/flash memory 104 includes user applications 61, system applications 63, and an energy adjustment algorithm 180. The HH processing module 100 can access the algorithm and applications stored on the HH hard disk/flash memory 104 to execute their functionality. The HH processing module 100 includes a CELL MAC 150 function to facilitate cellular communications as will be described in further detail below.

In an example of operation, HH RF 108 converts a downstream CELL RF signal from a cellular network into a downstream CELL symbol stream in accordance with a cellular communication protocol. HH BB 106 converts the downstream CELL symbol stream into a downstream CELL PHY signal in accordance with the cellular communication protocol. The CELL MAC 150 function of HH processing module 100 converts the downstream CELL PHY signal into a downstream MAC data for consumption of the HH processing module 100 to carry out cellular communications.

In another example of operation, HH processing module 100 produces upstream MAC data to support cellular communications. The CELL MAC 150 function converts the upstream MAC data into an upstream CELL PHY signal. The HH BB 106 function converts the upstream CELL PHY signal into an upstream CELL symbol stream in accordance with the cellular communication protocol. The HH RF 108 function converts the upstream CELL symbol stream into an upstream CELL RF signal in accordance with the cellular communication protocol and transmits the upstream CELL RF signal to the cellular network.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. A handheld computing unit comprises:
   a plurality of user applications and system applications;
   a femtocell access point, wherein when the handheld computing unit is in a femtocell access point (AP) mode, is operably coupled to:
      transmit an output cellular radio frequency (RF) signal in accordance with a femtocell protocol; and
      receive an input cellular RF signal in accordance with the femtocell protocol;
   a local wireless interface (LWI) operable to communicate over a wireless local area network (WLAN) and operably coupled to:
      receive a downstream WLAN RF signal in accordance with a WLAN protocol over the WLAN, wherein the downstream WLAN RF signal is converted into the output cellular RF signal; and
      transmit an upstream WLAN RF signal in accordance with the WLAN protocol, wherein the input cellular RF signal is converted into the upstream WLAN RF signal.

2. The handheld computing unit of claim 1, wherein the femtocell access point comprises:
a plurality of radio interface units, wherein each radio interface unit is operably coupled to communicate with at least one of a plurality of user equipment when the handheld computing unit is in a femtocell access point (AP) mode, and wherein at least one of the plurality of radio interface units is operable to:
receive the input cellular RF signal in accordance with the femtocell protocol from one of the plurality of user equipment;
convert the input cellular RF signal in accordance with the femtocell protocol into an upstream radio interface signal; and
transmit the output cellular radio frequency (RF) signal in accordance with the femtocell protocol to the one of the plurality of user equipment; and
convert a downstream radio interface signal into the output cellular radio frequency (RF) signal in accordance with the femtocell protocol;
a local radio network controller (RNC) operably coupled to the plurality of radio interface units, wherein the local RNC is operable to:
receive the upstream radio interface signal from the at least one of the plurality of radio interface units and convert the upstream radio interface signal into an upstream core network interface (CI) signal; and
convert a downstream core network interface (CI) signal into the downstream radio interface signal and transmit the downstream radio interface signal to the at least one of the plurality of radio interface units.

3. The handheld computing unit of claim 2, further comprising:
a core network (CN) interface operable to:
receive the upstream core network interface (CI) signal from the local RNC and convert the upstream core network interface (CI) signal into upstream local wireless interface (LWI) data; and
convert downstream LWI data into the downstream core network interface (CI) signal and transmit the downstream core network interface (CI) signal to the local RNC.

4. The handheld computing unit of claim 3, wherein the local wireless interface (LWI) is further operably coupled to:
convert the LWI upstream data from the core network interface into an LWI upstream RF signal formatted in accordance with a WLAN interface protocol; and
convert LWI downstream RF signal formatted in accordance with the WLAN interface protocol into the downstream LWI data.

5. The handheld computing unit of claim 4, wherein the local wireless interface comprises:
a local wireless interface (LWI) baseband processing module operably coupled to:
convert the LWI upstream data into an LWI upstream symbol stream in accordance with the WLAN interface protocol; and
convert an LWI downstream symbol stream into the LWI downstream data in accordance with the WLAN interface protocol;
a local wireless interface RF section operably coupled to:
convert the LWI upstream symbol stream into the upstream WLAN RF signal in accordance with the WLAN protocol; and
convert the upstream WLAN RF signal into the LWI downstream symbol stream.

6. The handheld computing unit of claim 1, further comprising:
a processing module operably coupled to:
determine energy demand of the handheld computing unit;
determine whether the energy demand compares unfavorably to energy performance criteria; and
when the energy demand compares unfavorably to the energy performance criteria, execute an energy adjustment algorithm.

7. The handheld computing unit of claim 6, wherein the energy adjustment algorithm comprises at least one of: off-loading one or more functions of the femtocell access point; utilizing a reduced set of functions of the femtocell access point; and
requesting coupling to an extended computing unit.

8. The handheld computing unit of claim 7, wherein the processing module is further operably coupled to, when executing the off-loading one or more of the femtocell AP functions:
determine the one or more of the femtocell AP functions to off-load based on
individual energy performance of the femtocell AP functions; and
determine one or more external processing resources to perform the one or more of the femtocell AP functions based on at least one of: a query-response communication, a look up table, a prioritization scheme, and network messaging.

9. The handheld computing unit of claim 6, wherein the processing module is further operably coupled to:
perform, from time to time, user application functions, wherein the energy adjustment algorithm further includes at least one of: off-loading one or more of the user application functions; and utilizing a reduced set of the user application functions.

10. The handheld computing unit of claim 6, wherein the processing module is further operably coupled to:
perform, from time to time, system application functions, wherein the energy adjustment algorithm further includes at least one of: off-loading one or more of the system application functions; and utilizing a reduced set of system application functions.

11. A handheld computing unit comprises:
a femtocell access point (AP) comprising a plurality of physical layer (PHY) units, wherein a PHY unit of the plurality of PHY units is operably coupled to, when the handheld computing unit is in a femtocell access point (AP) mode:
receive an upstream user equipment (UE) radio frequency (RF) signal in accordance with a femtocell protocol from a wireless user equipment and convert the upstream user equipment (UE) radio frequency (RF) signal into an upstream PHY signal; and
convert a downstream PHY signal into a downstream UE RF signal in accordance with the femtocell protocol and transmit the downstream UE RF signal in accordance with a femtocell protocol to the wireless user equipment;
a local wireless interface (LWI) operable to communicate over a wireless local area network (WLAN), wherein the LWI is operably coupled to:
convert LWI upstream data into an LWI upstream RF signal formatted in accordance with a wireless local area network (WLAN) interface protocol and transmit the LWI upstream RF signal over the WLAN;

receive an LWI downstream RF signal over the WLAN and convert the LWI downstream RF signal formatted in accordance with the WLAN interface protocol into LWI downstream data;

a processing module operably coupled to:
convert the LWI downstream data into one or more downstream PHY signals and convert one or more upstream PHY signals into the LWI upstream data, wherein the one or more downstream PHY signals include the downstream PHY signal and the one or more upstream PHY signals include the upstream PHY signal.

12. The handheld computing unit of claim 11, wherein the PHY unit comprises:
a radio frequency (RF) section operably coupled to, when the handheld computing unit is in a femtocell access point (AP) mode:
convert the upstream user equipment (UE) RF signal into an upstream UE symbol stream in accordance with a femtocell protocol; and
convert a downstream UE symbol stream into the downstream UE RF signal in accordance with the femtocell protocol; and
a baseband processing module operably coupled to, when the handheld computing unit is in the femtocell AP mode, perform baseband functions to:
convert the downstream PHY signal into the downstream UE symbol stream in accordance with the femtocell protocol; and
convert the upstream UE symbol stream into the upstream PHY signal in accordance with the femtocell protocol.

13. The handheld computing unit of claim 12 further comprises: when the handheld computing unit is in a cellular (CELL) mode, the radio frequency (RF) section is operably coupled to:
convert an upstream CELL RF signal into an upstream CELL symbol stream in
accordance with a cellular communication protocol; and
convert a downstream CELL symbol stream into a downstream CELL RF signal
in accordance with the cellular communication protocol;
wherein the baseband processing module is operably coupled to:
convert a downstream CELL physical layer (PHY) signal into the downstream CELL symbol stream in accordance with the cellular communication protocol; and
convert the upstream CELL symbol stream into an upstream CELL PHY signal in accordance with the cellular communication protocol; and
wherein the processing module is operably coupled to:
convert downstream medium access control (MAC) data in the downstream CELL PHY signal; and convert the upstream CELL PHY signal into an upstream MAC data.

14. The handheld computing unit of claim 11, wherein the processing module is operably coupled to:
determine energy demand of the handheld computing unit;
determine whether the energy demand compares unfavorably to energy performance criteria; and
when the energy demand compares unfavorably to the energy performance criteria, execute an energy adjustment algorithm.

15. The handheld computing unit of claim 14, wherein the energy adjustment algorithm comprises at least one of: off-loading one or more functions of the femtocell access point; utilizing a reduced set of functions of the femtocell access point; and requesting coupling to an extended computing unit.

16. The handheld computing unit of claim 15, wherein the processing module is further operably coupled to, when executing the off-loading one or more of the femtocell AP functions:
determine the one or more of the femtocell AP functions to off-load based on individual energy performance of the femtocell AP functions; and
determine one or more external processing resources to perform the one or more of the femtocell AP functions based on at least one of: a query-response communication, a look up table, a prioritization scheme, and network messaging.

17. A handheld computing unit comprises:
a plurality of user applications and system applications;
a femtocell access point, wherein when the handheld computing unit is in a femtocell access point (AP) mode, is operably coupled to:
transmit an output cellular radio frequency (RF) signal in accordance with a femtocell protocol to a wireless user equipment; and
receive an input cellular RF signal in accordance with the femtocell protocol from the wireless user equipment;
a local wireless interface (LWI) operable to communicate over a wireless local area network (WLAN) and operably coupled to:
receive a downstream WLAN RF signal in accordance with a WLAN protocol over the WLAN for the wireless user equipment originated from a cellular network, wherein the handheld computing unit is operable to convert the downstream WLAN RF signal into the output cellular RF signal; and
transmit an upstream WLAN RF signal in accordance with the WLAN protocol over the WLAN from the wireless user equipment destined to the cellular network, wherein the handheld computing unit is operable to convert the input cellular RF signal into the upstream WLAN RF signal.

18. The handheld computing unit of claim 17, wherein the femtocell access point is operable to:
convert the input cellular RF signal in accordance with the femtocell protocol into an upstream radio interface signal; and
convert a downstream radio interface signal into the output cellular radio frequency (RF) signal in accordance with the femtocell protocol; and
wherein the femtocell access point further comprises:
a local radio network controller (RNC) operable to:
convert the upstream radio interface signal into an upstream core network interface (CI) signal; and
convert a downstream core network interface (CI) signal into the downstream radio interface signal;
a core network (CN) interface operable to:
receive the upstream core network interface (CI) signal from the local RNC and convert the upstream core network interface (CI) signal into upstream local wireless interface (LWI) data; and
convert downstream LWI data into the downstream core network interface (CI) signal and transmit the downstream core network interface (CI) signal to the local RNC.

19. The handheld computing unit of claim 18, wherein the local wireless interface comprises:

a local wireless interface (LWI) baseband processing module operably coupled to:
  convert the LWI upstream data into an LWI upstream symbol stream in accordance with the WLAN interface protocol; and
  convert an LWI downstream symbol stream into the LWI downstream data in accordance with the WLAN interface protocol;
a local wireless interface RF section operably coupled to:
  convert the LWI upstream symbol stream into the upstream WLAN RF signal in accordance with the WLAN protocol; and
  convert the upstream WLAN RF signal into the LWI downstream symbol stream.

20. The handheld computing unit of claim 17, further comprising:
a processing module operably coupled to:
  determine energy demand of the handheld computing unit;
  determine whether the energy demand compares unfavorably to energy performance criteria; and
  when the energy demand compares unfavorably to the energy performance criteria, execute an energy adjustment algorithm.

\* \* \* \* \*